US010219024B2

(12) United States Patent
Yamagishi

(10) Patent No.: US 10,219,024 B2
(45) Date of Patent: Feb. 26, 2019

(54) TRANSMISSION APPARATUS, METAFILE TRANSMISSION METHOD, RECEPTION APPARATUS, AND RECEPTION PROCESSING METHOD

(71) Applicant: SATURN LICENSING LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/783,710

(22) PCT Filed: Apr. 16, 2014

(86) PCT No.: PCT/JP2014/060873
§ 371 (c)(1),
(2) Date: Oct. 9, 2015

(87) PCT Pub. No.: WO2014/171498
PCT Pub. Date: Oct. 23, 2014

(65) Prior Publication Data
US 2016/0037206 A1 Feb. 4, 2016

(30) Foreign Application Priority Data

Apr. 18, 2013 (JP) ................................. 2013-087898

(51) Int. Cl.
*H04N 7/173* (2011.01)
*H04N 21/431* (2011.01)
(Continued)

(52) U.S. Cl.
CPC ... *H04N 21/4312* (2013.01); *H04N 21/23439* (2013.01); *H04N 21/6125* (2013.01);
(Continued)

(58) Field of Classification Search
None
See application file for complete search history.

(56) References Cited

U.S. PATENT DOCUMENTS 6,097,441 A * 8/2000 Allport ................ H04N 5/4401
348/120
8,495,675 B1 * 7/2013 Philpott ............... H04H 20/103
725/105

(Continued)

FOREIGN PATENT DOCUMENTS

JP 2011-193058 9/2011
WO WO2012093714 * 12/2012 ........................ 7/173

OTHER PUBLICATIONS

International Search Report issued in International Patent Application No. PCT/JP2014/0690873 dated Jul. 8, 2014, 3 pages.

(Continued)

*Primary Examiner* — Fernando Alcon
(74) *Attorney, Agent, or Firm* — Oblon, McClelland, Maier & Neustadt, L.L.P.

(57) ABSTRACT

[Object] To cause presentation layout control of a content to be performed with ease.
[Solving Means] A metafile is received by a reception section. The metafile includes acquisition information used for a client terminal to acquire a predetermined number of data streams of a content that can be delivered by a delivery server via a network. The metafile also includes reference information for referencing a file including presentation control information for performing presentation control of the content or the presentation control information for performing presentation control of the content. A processing section carries out processing based on the received metafile.

18 Claims, 21 Drawing Sheets

(51) Int. Cl.
*H04N 21/2343* (2011.01)
*H04N 21/643* (2011.01)
*H04N 21/6543* (2011.01)
*H04N 21/845* (2011.01)
*H04N 21/61* (2011.01)
*H04N 21/6332* (2011.01)

(52) U.S. Cl.
CPC ... *H04N 21/6332* (2013.01); *H04N 21/64322* (2013.01); *H04N 21/6543* (2013.01); *H04N 21/8456* (2013.01)

(56) References Cited

U.S. PATENT DOCUMENTS

| | | | | |
|---|---|---|---|---|
| 2011/0096828 A1* | 4/2011 | Chen | H04N 21/23106 | 375/240.02 |
| 2011/0125919 A1* | 5/2011 | Kwon | H04N 21/23439 | 709/231 |
| 2011/0246563 A1* | 10/2011 | Keum | H04N 7/17318 | 709/203 |
| 2012/0023251 A1* | 1/2012 | Pyle | H04N 21/234327 | 709/231 |
| 2012/0042335 A1* | 2/2012 | Hwang | H04N 21/41407 | 725/32 |
| 2012/0233345 A1* | 9/2012 | Hannuksela | H04N 21/26258 | 709/231 |
| 2013/0042013 A1* | 2/2013 | Bouazizi | H04N 21/23439 | 709/228 |
| 2013/0195204 A1* | 8/2013 | Reznik | H04N 19/85 | 375/240.26 |
| 2013/0282876 A1* | 10/2013 | Watanabe | H04L 67/06 | 709/219 |
| 2013/0342762 A1* | 12/2013 | Wang | H04N 19/70 | 348/583 |
| 2014/0007158 A1* | 1/2014 | Bhagwat | H04N 21/814 | 725/33 |
| 2015/0089558 A1* | 3/2015 | Shimizu | H04N 5/765 | 725/96 |
| 2015/0172734 A1* | 6/2015 | Kim | H04N 21/2665 | 725/110 |
| 2015/0181258 A1* | 6/2015 | Kim | H04N 21/21805 | 725/32 |

OTHER PUBLICATIONS

Nokia Corporation, "Usage of SMIL for the MPDN", [on line], 1-16 2010.01.20, [retrieved on Jun. 20, 2014], Retrieved from the Internet: <URL: http://www.3gpp.org/ftp/TSG_SA/WG4_CODEC/TSGS4_57/Docs/S4-100096. zip (S4-100096_SMIL_for MPD. doc)>, 4 pages.

RealNetworks, Inc., [online], 2004. 03. 15, "SMIL", {[ retrieved on Jun. 20, 2014],Retrieved from the Internet: <URL: https://service.jp.real.com/helix/help/library/guides/IntroToStreaming/htmfiles/smillayt.htm>, 19 pages, with English Translation.

Diego Gibellino, "Content Distribution for OTT Video Services—MPEG DASH and CENC", [online], 2013. 05, p. 15, [retrieved on Jun. 20, 2014], Retrieved from the Internet: <URL:http://www.hdforumconference.com/wp-content/uploads/2013/06/Gibellino.pdf>, 8 pages, with English Translation.

RealNetworks, Inc., "RealNetworks Production Guide", [online], 1-16, Jul. 20, 2004, "Chapter 18: Switching", [retrieved on Jul. 20, 2004], Retrieved from the Internet: <URL: http://service.real.com/help/library/guides/ProductionGuide/productguide/htmfiles/content.htm>, 656 pages.

* cited by examiner (a)

(b)

TRANSMISSION APPARATUS, METAFILE TRANSMISSION METHOD, RECEPTION APPARATUS, AND RECEPTION PROCESSING METHOD

TECHNICAL FIELD

The present technique relates to a transmission apparatus, a metafile transmission method, a reception apparatus, and a reception processing method, more particularly, to a transmission apparatus etc. that transmits a metafile including information on a predetermined number of data streams of contents that can be delivered from a delivery server via a network to a client terminal via the network.

BACKGROUND ART

From the past, there has been proposed an IPTV (Internet Protocol Television) delivery system that uses a network such as the Internet (see, for example, Patent Document 1). As a flow of standardization of Internet streaming such as IPTV, standardization of a system to be applied to VoD (Video On Demand System) streaming by HTTP (Hyper Text Transfer Protocol) streaming and live streaming is being performed.

In particular, DASH (Dynamic Adaptive Streaming over HTTP) that performs standardization based on ISO/IEC/MPEG is attracting attention. DASH acquires and reproduces streaming data based on a metafile called MPD (Media Presentation Description) and an address (URL) of chunk media data (media data such as Audio/Video/Subtitle) described in the metafile.

In an MPD format, attributes can be described using an element called Representation for each stream of audio, video, and the like. For example, for each of a plurality of video streams having different rates, the rates are described using different Representations. On a client side, an optimal stream can be selected according to a state of a network environment the client is put in while referring to the rate values.

Patent Document 1: Japanese Patent Application Laid-open No. 2011-193058

SUMMARY OF INVENTION

Problem to be Solved by the Invention

In current DASH, there is no attribute that describes a spatial layout of a stream on a display screen or an attribute that designates a type of a target display device. However, if a spatial layout and a type of the target display device can be described using only MPD (Media Presentation Description), a browser layer such as HTML5 that describes presentation layout control, a file that describes an attribute for designating a target display not even in HTML5, and the like become unnecessary, and thus simple authoring can be expected.

The present technique aims at causing presentation layout control of a content to be performed with ease.

Means for Solving the Problem

According to a concept of the present technique, there is provided a transmission apparatus including:

a storage section that stores a metafile including, together with acquisition information used for a client terminal to acquire a predetermined number of data streams of a content that can be delivered by a delivery server via a network, reference information for referencing a file including presentation control information for performing presentation control of the content or the presentation control information for performing presentation control of the content; and a transmission section that transmits, to the client terminal via the network, the stored metafile in response to a transmission request transmitted from the client terminal via the network.

In the present technique, the storage section stores the metafile. The metafile includes, together with the acquisition information used for the client terminal to acquire a predetermined number of data streams of the content that can be delivered by the delivery server via the network, reference information for referencing a file including presentation control information for performing presentation control of the content or the presentation control information for performing presentation control of the content. For example, the metafile may be an extended MPD file, and the presentation control information may be an extended SMIL element.

The transmission section transmits, to the client terminal via the network, the stored metafile in response to a transmission request transmitted from the client terminal via the network. Examples of the client terminal include a television receiver, a tablet terminal, and a mobile terminal.

For example, the presentation control information may include reference information for referencing a predetermined control target element included in the acquisition information. In this case, for example, the metafile may be an extended MPD file, and the control target element may be an adaptation set element or a representation element. Moreover, for example, the presentation control information may include presentation time information of a parent presentation element including a predetermined number of child presentation elements.

Further, for example, the presentation control information may include presentation control information corresponding to a plurality of presentation device types. In this case, for example, the presentation control information may include information for designating presentation control information of a second presentation device type that may coexist with presentation control information of a first presentation device type.

In such a technique, the metafile to be transmitted to the client terminal includes, together with the acquisition information used for the client terminal to acquire a predetermined number of data streams of a content that can be delivered by the delivery server via the network, the reference information for referencing a file including presentation control information for performing presentation control of the content or the presentation control information for performing presentation control of the content. Therefore, for example, content presentation layout control can be performed with ease in the client terminal.

According to another concept of the present technique, there is provided a reception apparatus including:

a reception section that receives a metafile including, together with acquisition information used for a client terminal to acquire a predetermined number of data streams of a content that can be delivered by a delivery server via a network, reference information for referencing a file including presentation control information for performing presentation control of the content or the presentation control information for performing presentation control of the content; and a processing section that carries out processing based on the received metafile.

In the present technique, the reception section receives the metafile. The metafile includes, together with the acquisition information used for the client terminal to acquire a predetermined number of data streams of the content that can be delivered by the delivery server via the network, the reference information for referencing a file including the presentation control information for performing presentation control of the content or the presentation control information for performing presentation control of the content. For example, the metafile may be an extended MPD file, and the presentation control information may be an extended SMIL element. The processing section carries out processing based on the received metafile.

For example, the presentation control information may include reference information for referencing a predetermined control target element included in the acquisition information. In this case, for example, the metafile may be an extended MPD file, and the control target element may be an adaptation set element or a representation element. Moreover, for example, the presentation control information may include presentation time information of a parent presentation element including a predetermined number of child presentation elements.

Further, for example, the presentation control information may include presentation control information corresponding to a plurality of presentation device types. In this case, for example, the presentation control information may include information for designating presentation control information of a second presentation device type that may coexist with presentation control information of a first presentation device type.

In such a technique, the metafile to be received includes, together with the acquisition information used for the client terminal to acquire a predetermined number of data streams of a content that can be delivered by the delivery server via the network, the reference information for referencing a file including presentation control information for performing presentation control of the content or the presentation control information for performing presentation control of the content. Therefore, for example, content presentation layout control can be performed with ease.

Effect of the Invention

According to the present technique, the content presentation layout control can be performed with ease. It should be noted that the effect described in the specification is merely an example and is not limited thereto, and there may be additional effects.

MODE FOR CARRYING OUT THE INVENTION

Hereinafter, a form for embodying the present invention (hereinafter, referred to as "embodiment") will be described. It should be noted that the descriptions will be given in the following order.

1. Embodiment
2. Modified Example
<1. Embodiment>
(Stream Delivery System)

Figure 1:
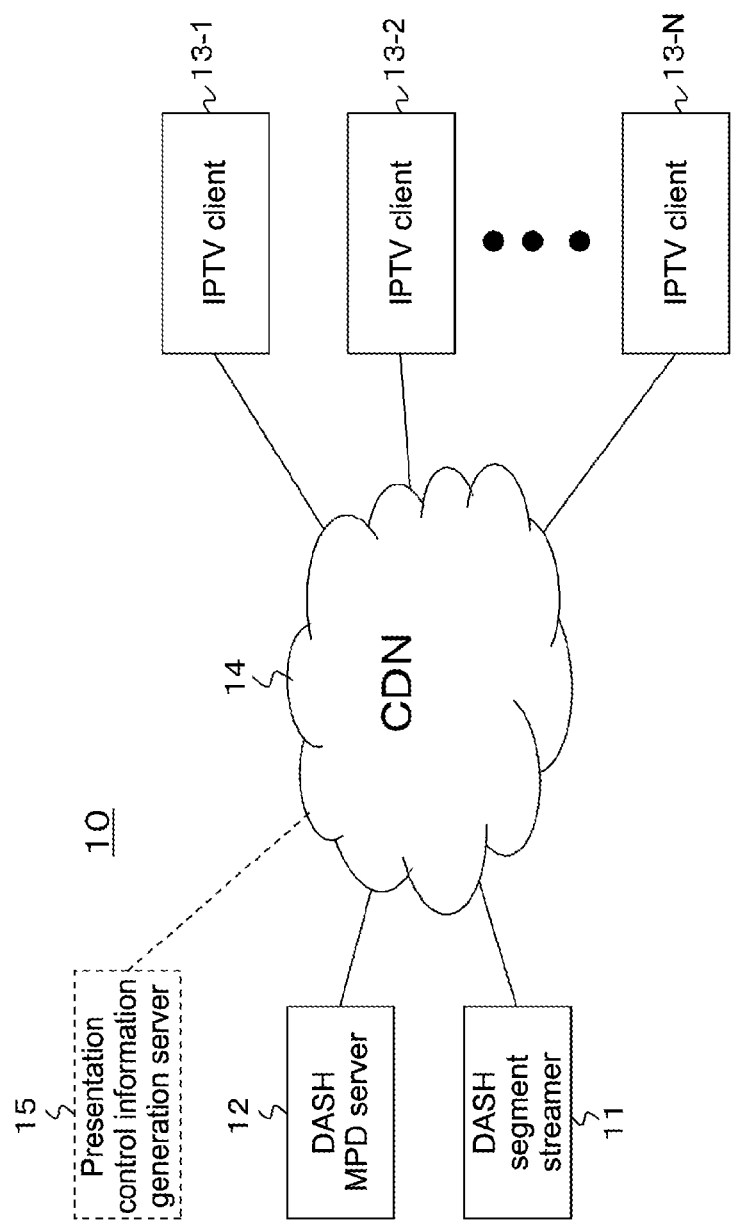
FIG. 1. A block diagram showing a structural example of a stream delivery system as an embodiment.

FIG. 1 shows a structural example of a stream delivery system 10 as an embodiment. The stream delivery system 10 is an MPEG-DASH base stream delivery system. The stream delivery system 10 has a structure in which N IPTV clients 13-1, 13-2, . . . , 13-N are connected to a DASH segment streamer 11 and a DASH MPD server 12 via a CDN (Content Delivery Network) 14. It should be noted that as indicated by a broken line in FIG. 1, a presentation control information generation server 15 may be connected to the N IPTV clients 13-1, 13-2, . . . , 13-N via the CDN 14.

The DASH segment streamer 11 is a web server. The DASH segment streamer 11 generates a stream segment of a DASH specification (hereinafter, referred to as "DASH segment") based on media data (video data, audio data, subtitle data, etc.) of a predetermined content and stores it in a storage section constituted of an HDD and the like. Then, in response to a request from the IPTV client, a transmission section transmits the DASH segment to the request source IPTV client as will be described later.

Further, in response to a request of a segment of a predetermined stream transmitted from the IPTV client 13 (13-1, 13-2, . . . , 13-N) via the CDN 14, the DASH segment streamer 11 transmits a segment of the stream to the request source IPTV client 13 via the CDN 14. In this case, the IPTV client 13 references rate values described in an MPD file and selects a stream of an optimal rate according to a network environment that the client is put in.

The DASH MPD server 12 generates an MPD file for acquiring a DASH segment generated in the DASH segment streamer 11 and stores it in the storage section constituted of an HDD and the like. Then, in response to a request from the IPTV client, the transmission section transmits the MPD file to the request source IPTV client as will be described later. The DASH MPD server 12 generates an MPD file based on content metadata from a content management server (not shown in FIG. 1) and an address (URL) of the segment generated in the DASH segment streamer 11.

In an MPD format, attributes can be described using an element called Representation for each stream of video, audio, and the like. For example, for each of a plurality of video data streams having different rates, the rates are described using different Representations in the MPD file. In the IPTV client 13, an optimal stream can be selected according to a state of the network environment the IPTV client 13 is put in as described above while referring to the rate values.

Figure 2:
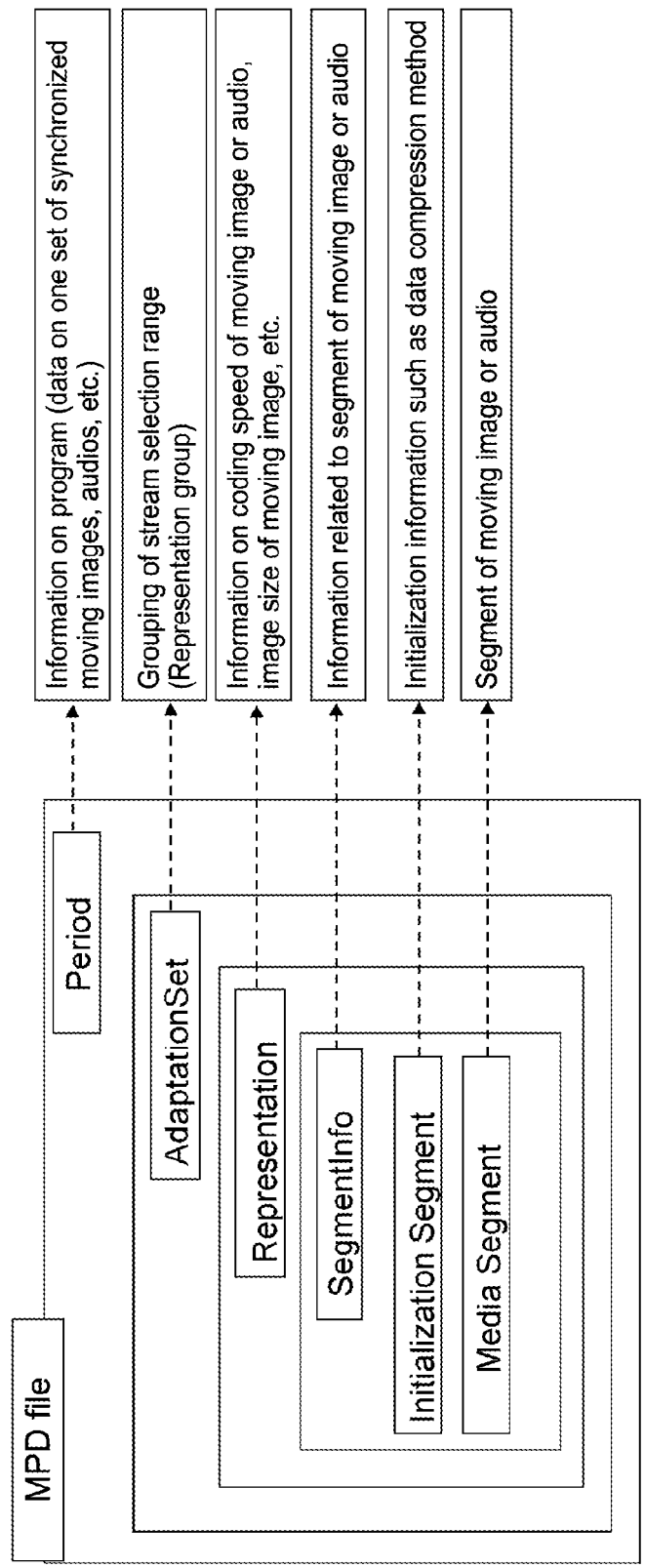
FIG. 2. A diagram showing a hierarchical structure of an MPD file.

The MPD file has a hierarchical structure as shown in FIG. 2. In the MPD file, information on a moving image stored in the DASH segment streamer 11, such as a compression method, a coding rate, an image size, and a language, are described hierarchically in an XML format. The MPD file hierarchically includes structures (elements) of a Period, AdaptationSet, Representation, SegmentInfo, Initialization Segment, and Media Segment.

The Period structure includes information on a program (data of one set of moving image, audio, etc. in sync). The AdaptationSet structure included in the Period structure groups a stream selection range (Representation group). Further, the Representation structure included in the AdaptationSet structure includes information such as a coding rate of a moving image or audio and an audio size of a moving image.

Furthermore, the SegmentInfo structure included in the Representation structure includes segment-related information on a moving image and audio. Further, the Initialization Segment structure included in the SegmentInfo structure includes initialization information such as a data compression method. Moreover, the Media Segment structure included in the SegmentInfo structure includes information such as an address for acquiring a segment of a moving image and audio.

Figure 3:
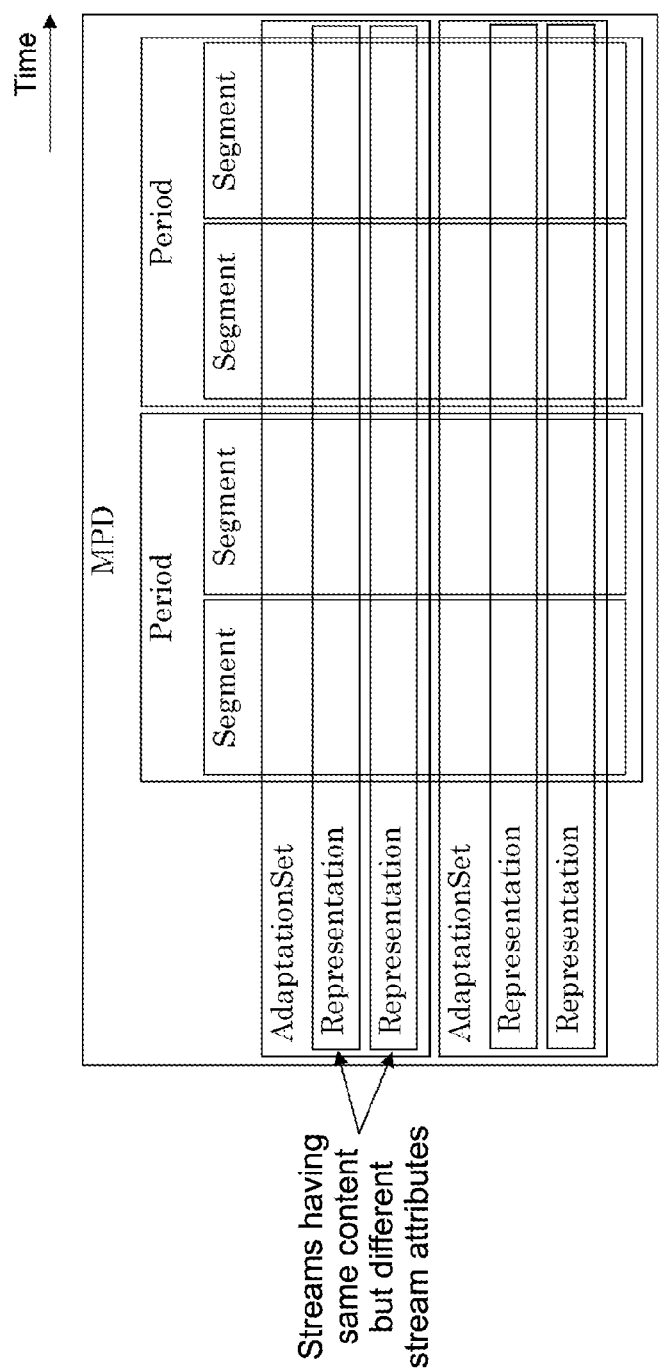
FIG. 3. A diagram showing an example of structures included in the MPD file, that are aligned on a time axis.

FIG. 3 shows an example of the structures included in the MPD file, that are aligned on a time axis. In this example, two Periods are included in the MPD file, and two segments are included in each Period. Also in this example, two AdaptationSets are included in each Period, and two Representations regarding streams having the same content but different stream attributes are included in each AdaptationSet.

Figure 4:
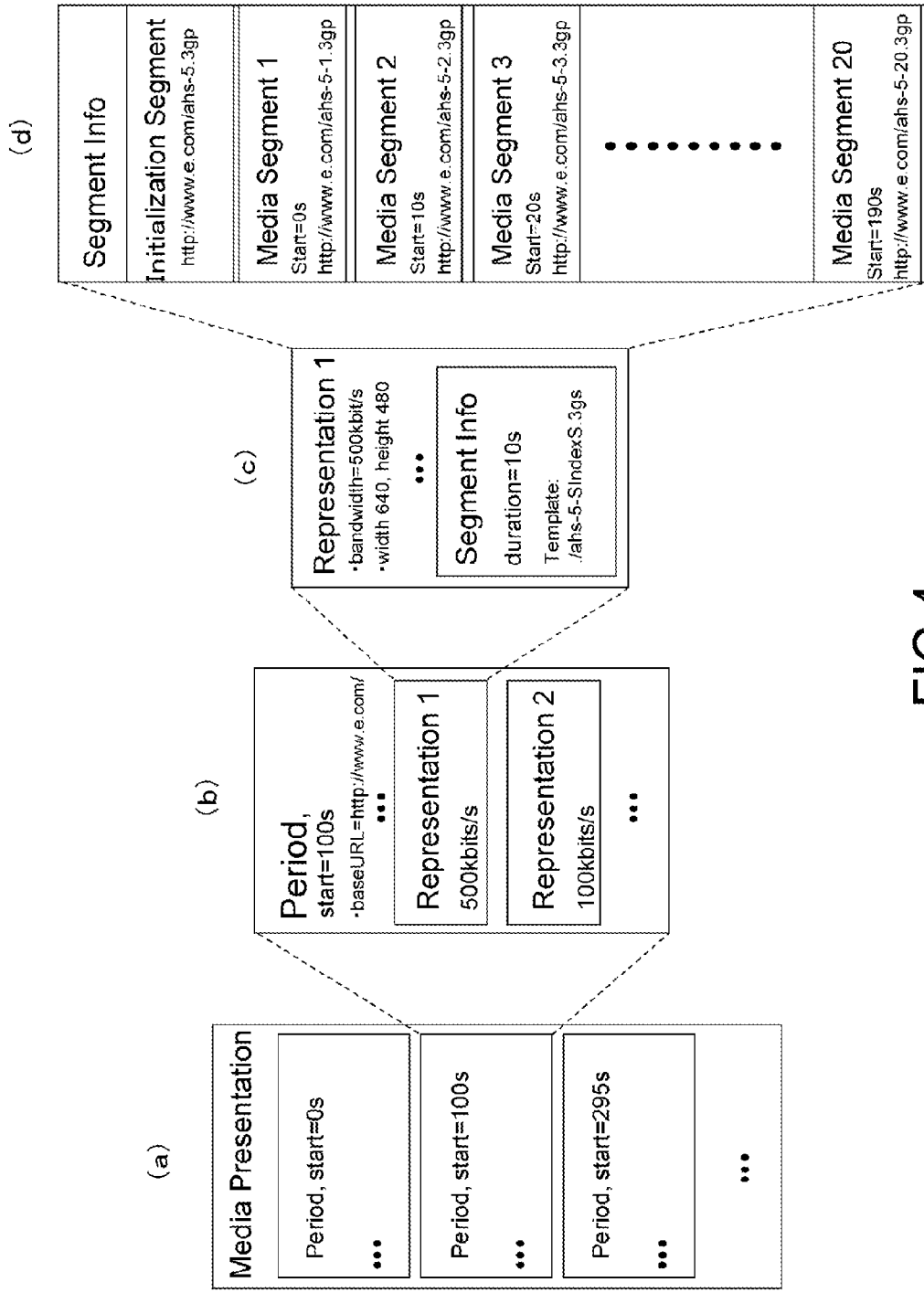
FIG. 4. Diagrams showing an example of a relationship of the structures arranged in an hierarchy in the MPD file.

FIG. 4 show an example of the relationship of the structures hierarchically arranged in the MPD file. As shown in FIG. 4(*a*), in Media Presentation as the entire MPD file, there exist a plurality of Periods sectioned in time intervals. For example, the first Period is 0 second from the start, the next Period is 100 seconds from the start, and so on.

As shown in FIG. 4(*b*), each Period includes a plurality of Representations. In the plurality of Representations, there exists a Representation group related to video data streams having the same content but different stream attributes, for example, different rates, that is grouped by the AdaptationSet described above.

As shown in FIG. 4(*c*), the Representation includes the SegmentInfo. As shown in FIG. 4(*d*), the SegmentInfo includes the Initialization Segment and a plurality of Media Segments in which information of each segment obtained by additionally sectioning the Period is described. The Media Segment includes information such as an address (URL) for actually acquiring segment data of a video, audio, and the like.

It should be noted that stream switching can be performed freely among the plurality of Representations grouped by the AdaptationSet. Accordingly, a stream of an optimal rate can be selected according to the state of the network environment that the IPTV client is put in, and an uninterrupted moving image delivery becomes possible.

Figure 5:
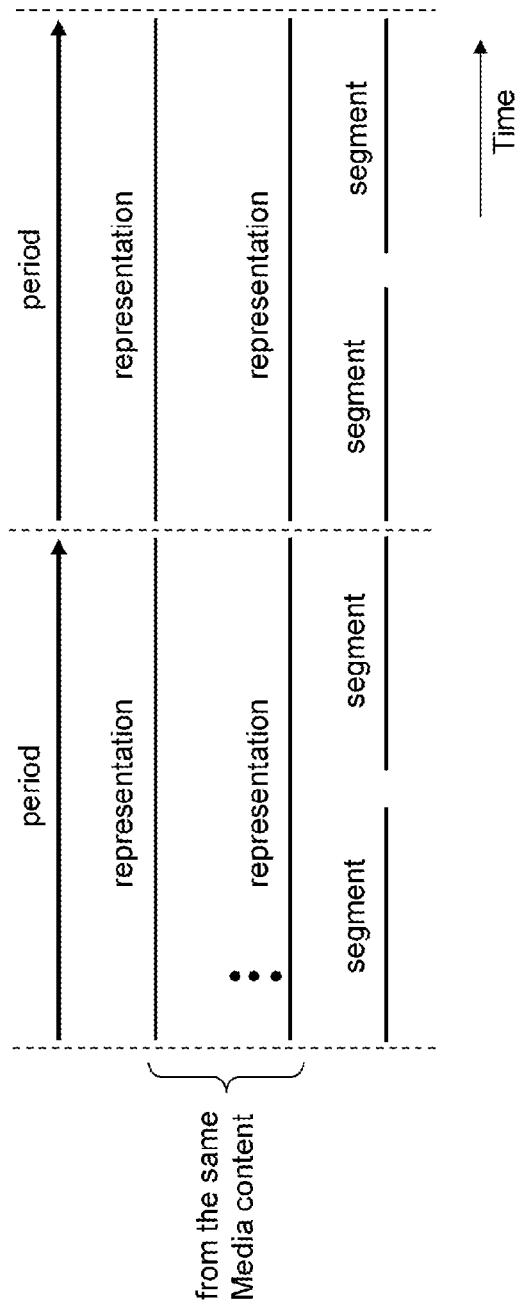
FIG. 5. A diagram showing an example of a relationship among a Period, Representation, and Segment.

FIG. 5 shows an example of a relationship among the Period, Representation, and Segment. In this example, two Periods are included in the MPD file, and two segments are included in each Period. Also in this example, each Period includes a plurality of Representations related to the same media content.

Figure 6:
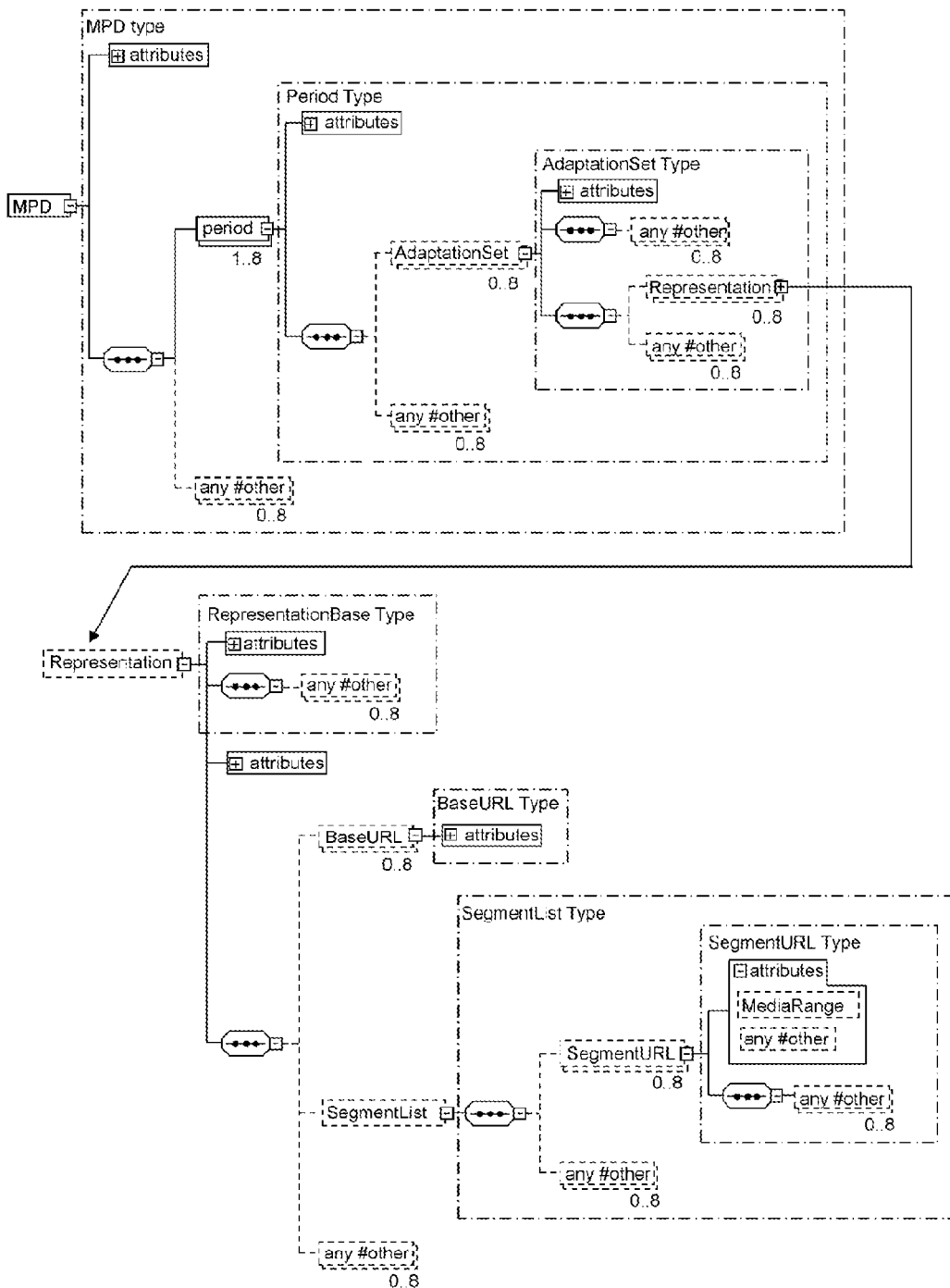
FIG. 6. A diagram showing a structure of the MPD file in a tree form.

FIG. 6 shows a structure of the MPD file in a tree form. There is a Period element below the MPD element. Moreover, there is an AdaptationSet element below the Period element, and a Representation element further below that. In addition, there is a SegmentList element below the Representation element, and a SegmentURL element further below that.

A sequence of chunk content data constituting a stream is defined by DASH to be expressed as a sequence of the file "url" storing the chunk content data or, when the chunk content data is accommodated in a file, a sequence of "URL+byte range" of a file storing the data.

For example, when expressed by the sequence of "URL+byte range", the MPD file is described as follows.

```
<MPD .... >
<Period ..... >
    <AdaptationSet>
        <Representation .....>
          ......
           <BaseURL>http://example.com/counter-
10mn_avc_dash.mp4</BaseURL>
           <SegmentList ..... >
             ......
              <SegmentURL mediaRange="795-83596" />
              <SegmentURL mediaRange="83597-166046" />
              <SegmentURL mediaRange="166047-248857" />
              <SegmentURL mediaRange="248858-331477" />
              ........
</MPD>
```

The URL of a file that stores a target MP4 medium is expressed by "http://example.com/counter-10mn_avc_dash.mp4" stored in MPD/Period/AdaptationSet/Representation/BaseURL.

Moreover, MPD/Period/AdaptationSet/Representation/SegmentList/SegmentURL/@mediaRange="795-83596"" indicates that a byte range from a 795-th byte to an 83596-th byte in the file is the first Segment. In addition, MPD/Period/AdaptationSet/Representation/SegmentList/SegmentURL/@mediaRange="83597-166046"" indicates that a byte range from an 83587-th byte to a 166046-th byte in the file is the second Segment.

When acquiring those segments from the client, an HTTP request is issued after designating the byte range in a range header together with "http://example.com/counter-10mn_avc_dash.mp4" as a file "url".

For acquiring the first segment, "http://example.com/counter-10mn_avc_dash.mp4" is designated as the file url, and "795-83596" is designated as the range designation as follows.
GET /counter-10mn_avc_dash.mp4 HTTP/1.1
Host: example.com
Range: bytes=795-83596

Moreover, for acquiring the second segment, "http://example.com/server/counter-10mn_aacdash.mp4" is designated as the file url, and "83597-166046" is designated as the range designation as follows.
GET /counter-10mn_avc_dash.mp4 HTTP/1.1
Host: example.com
Range: bytes=83597-166046

In this embodiment, the MPD file is obtained by extending a current MPD file. Hereinafter, the MPD file in this embodiment will be referred to as "extended MPD file" as appropriate.

The extended MPD file includes reference information for referencing a file including presentation control information for performing content presentation control or the presentation control information for performing content presentation control. In this embodiment, the presentation control information is an extended SMIL (Synchronized Multimedia Integration Language) element obtained by extending a current SMIL element. It should be noted that the similar extension may be performed for descriptive languages other than SMIL, such as MHEG (Multimedia and Hypermedia Experts Group), BML (Broadcast Markup Language), and DHTML (Dynamic HyperText Markup Language).

Figure 7:
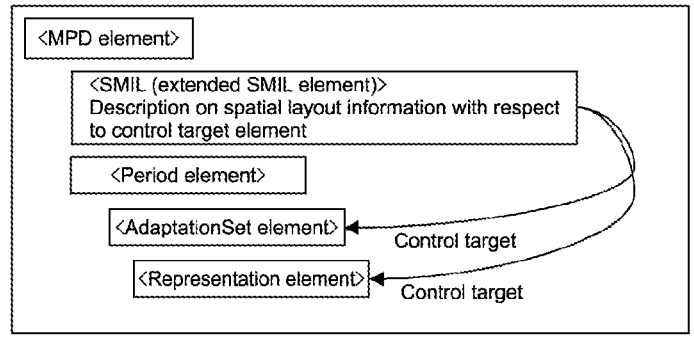
FIG. 7. Diagrams schematically showing extended MPD files (extended SMIL-inclusive extended MPD file and extended SMIL-reference extended MPD file).
Figure 7:
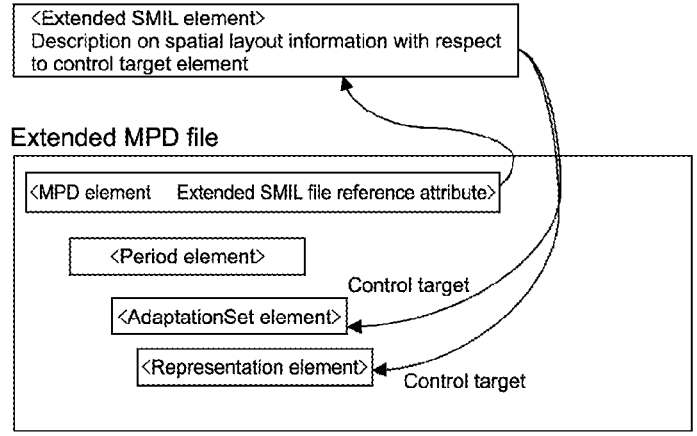

FIG. 7 schematically show extended MPD files. FIG. 7(a) shows an extended SMIL-inclusive extended MPD file. The extended SMIL file includes an extended SMIL element as the presentation control information. The extended SMIL element is arranged equal to the Period element as other elements (any#other) below the MPD element (see FIG. 6).

FIG. 7(b) shows an extended SMIL-reference extended MPD file. The extended MPD file includes an extended SMIL file reference attribute for referencing an extended SMIL file having an extended SMIL element as the presentation control information. The reference attribute is arranged as other attributes below the MPD element (see FIG. 6).

In this embodiment, reference information for referencing a control target element included in the extended MPD file, such as the AdaptationSet element and the Representation element, is arranged in the extended SMIL element. Specifically in this case, reference with respect to a control target element is designated by an xlink:type attribute (value "locator") and xlink:href attribute so that the reference attribute with respect to the AdaptationSet element and the Representation element in the MPD as a control description target can be designated with respect to a ref element used for general media reference in a SMIL BasicMedia module.

In this embodiment, presentation time information of a parent presentation element including a predetermined number of child presentation elements is arranged in the extended SMIL element. Specifically in this case, with respect to a region element that controls a position/size of a media object element in a SMIL BasicLayout module, it is possible to arrange a begin attribute, a dur attribute, and an end attribute that designate a start time/duration time/end time at which a content is activated (reproduced), that is referenced by the parent element, in a SMIL Timing&Synchronization module.

Further, in this embodiment, it is possible to arrange the presentation control information corresponding to a plurality of presentation device types in the extended SMIL element. Specifically in this case, a layout element capable of being included in a head element in the SMIL element stores information on how to position a target element on a visually- or auditorily-abstract device rendering image of a document. A plurality of layout elements are prepared for each presentation device type and enumerated in a switch element that enables a group of candidate layouts to be designated. Accordingly, the layout can be defined by the presentation device type. At this time, system-device-class is newly introduced as a test attribute that expresses a display type of the device.

Moreover, in this embodiment, it is made possible to arrange information that designates the presentation control information of a second presentation device type that may coexist with the presentation control information of a first presentation device type. Specifically in this case, for designating a set of region elements unrelated to the parent region with respect to the child (sub-) region that may constantly coexist with a certain region element, a coexistWith attribute is introduced into the region element so that an ID of the target region element can be designated.

Figure 8:
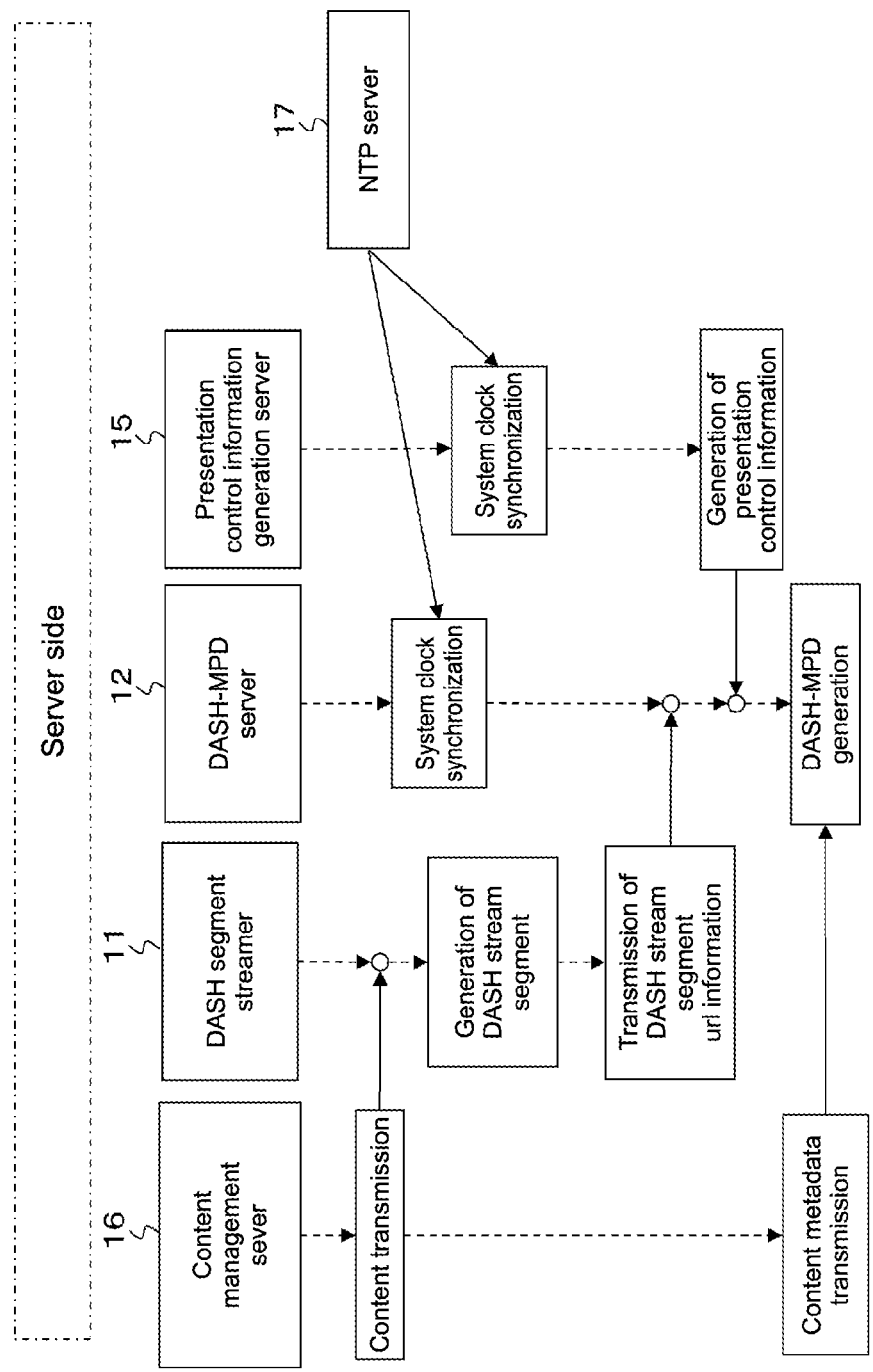
FIG. 8. A diagram showing an example of a flow up to generation of a DASH segment, a DASH MPD file, and the like from a content.

FIG. 8 shows an example of a flow up to generation of a DASH segment, a DASH MPD file, and the like from a content. A content is transmitted from a content management sever 16 to the DASH segment streamer 11. The DASH segment streamer 11 generates a DASH segment of each data stream based on the video data, audio data, and the like constituting the content.

Moreover, the DASH segment streamer 11 transmits information on an address (url) of the generated DASH segment of each data stream to the DASH MPD server 12. The content management sever 15 transmits metadata of the content to the DASH MPD server 12.

The DASH MPD server 12 and a presentation control information generation server 15 synchronize a system clock based on time information supplied from an NTP (Network Time Protocol) server 17. The presentation control information generation server 15 generates the extended SMIL element described above as the presentation control information.

The presentation control information generation server 15 transmits, when the DASH MPD server 12 generates an extended SMIL-inclusive extended MPD file (see FIG. 7(a)), the generated extended SMIL element to the DASH MPD server 12. On the other hand, when the DASH MPD server 12 generates an extended SMIL-reference extended MPD file (see FIG. 7(b)), the presentation control information generation server 15 generates and stores an extended SMIL file including the generated extended SMIL element. Then, the presentation control information generation server 15 transmits information on the address (url) for acquiring the extended SMIL file to the DASH MPD server 12.

Based on the address information of the DASH segment of each data stream, the content metadata, and the address information of the extended SMIL element or extended SMIL file, the DASH MPD server 12 creates and stores an extended MPD file. It should be noted that the DASH MPD server 12 may include the function of the presentation control information generation server 15. In such a case, the presentation control information generation server 15 becomes unnecessary.

Figure 9:
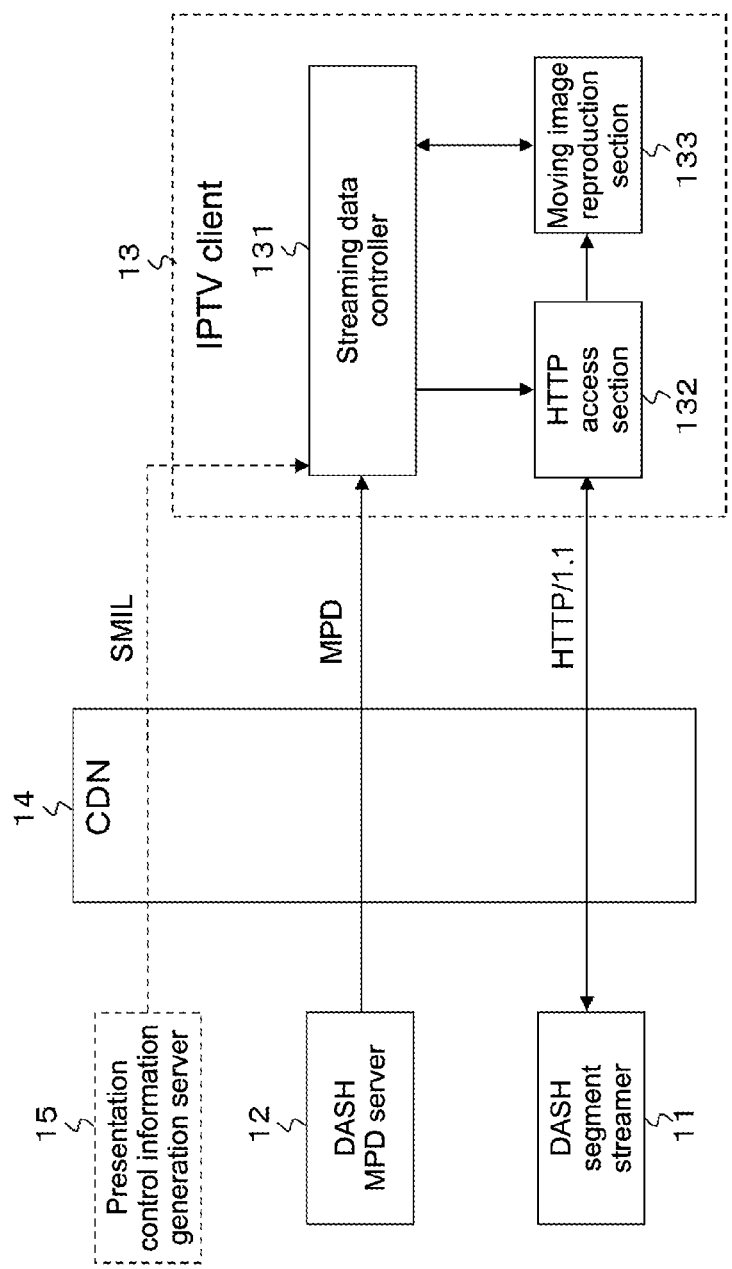
FIG. 9. A diagram for explaining a structural example of an IPTV client.

FIG. 9 shows a structural example of the IPTV client 13 (13-1 . . . 13-N). The IPTV client 13 constitutes a reception section and a processing section. The IPTV client 13 includes a streaming data controller 131, an HTTP access section 132, and a moving image reproduction section 133. The streaming data controller 131 acquires an extended MPD file from the DASH MPD server 12 and analyzes a content thereof. When the extended MPD file is an extended SMIL-reference type, an extended SMIL file is additionally acquired from the presentation control information generation server 15 (DASH MPD server 12 when DASH MPD server 12 includes function of presentation control information generation server 15) based on the address information included in the file.

The HTTP access section 132 requests a moving image or audio segment used for reproducing a moving image to the DASH segment streamer 11 based on the extended SMIL element. Here, when the reference information of the AdaptationSet element included in the extended MPD file is arranged in the extended SMIL element, a stream of an optimal image size or coding speed can be selected while taking the screen size of the IPTV client 13, the transmission channel state, and the like into account. For example, a switch is made to request a segment having a low coding speed (rate) at a first stage and request a segment having a high coding speed (rate) when the communication state is favorable.

The HTTP access section 132 transmits the received moving image or audio segment to the moving image reproduction section 133. The moving image reproduction section 133 carries out decoding processing on the segments transmitted from the HTTP access section 132 to acquire one moving image content and reproduces the moving image and audio. It should be noted that though not shown in FIG. 9, the IPTV client 13 also includes a reproduction section for a still image (Image). Therefore, still image data is acquired from a server while referencing the address information included in the extended SMIL element, and a still image is reproduced.

Figure 10:
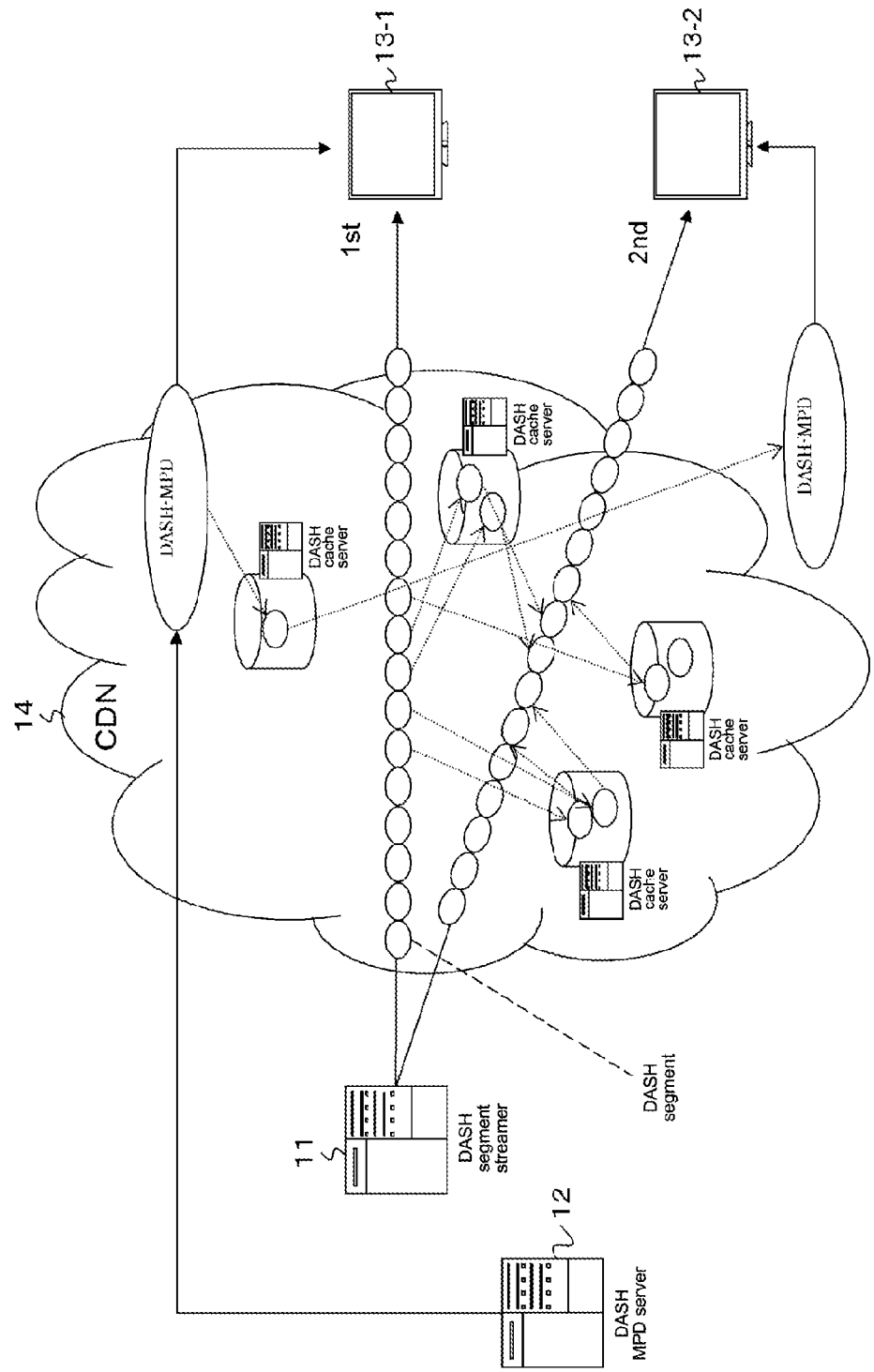
FIG. 10. A diagram showing a generally-used system of a DASH base stream delivery system.

FIG. 10 shows a generally-used system of a DASH base stream delivery system. The DASH MPD file and the DASH segment are also delivered via the CDN (Content Delivery Network) 14. The CDN 14 has a structure in which a plurality of cache servers (DASH cache servers) are arranged in a network array.

The cache server receives an HTTP request for acquiring an MPD file from the IPTV client 13. If the MPD file is in a local MPD cache, the cache server sends it back to the IPTV client 13 as an HTTP response. If the file is not in the local MPD cache, the cache server transfers the request to the DASH MPD server 12 or a higher-order cache server. Then, the cache server receives an HTTP response storing the MPD file, transfers it to the IPTV client 13, and carries out cache processing.

Further, the cache server receives an HTTP request for acquiring the DASH segment from the IPTV client 13. If the segment is in a local segment cache, the cache server sends it back to the IPTV client 13 as an HTTP response. If the segment is not in the local segment cache, the cache server transfers the request to the DASH segment streamer 11 or a higher-order cache server. Then, the cache server receives an HTTP response storing the DASH segment, transfers it to the IPTV client 13, and carries out cache processing.

In the CDN 14, the DASH segment delivered to the IPTV client 13-1 that has first issued the HTTP request is temporarily cached by the cache server on the pathway, and the cached DASH segment is delivered with respect to an HTTP request from another subsequent IPTV client 13-2. Therefore, an HTTP streaming delivery efficiency with respect to a large number of IPTV clients can be improved.

[Operation Example of IPTV Client]

Next, an operation example based on the extended MPD file acquired from the DASH MPD server 12 in the IPTV client 13 will be described.

"Use case 1 (Area change)"

In the use case 1, the extended SMIL-reference extended MPD file (mpd-1.mpd) as follows is acquired from the DASH MPD server 12.

```
<MPD ... smilRef=http://a.com/smil-1.smil >
    <BaseURL>http://example.com/</BaseURL>
    <Period ...>
        <AdaptationSet ...> -- Video1
            <Representation id="repId-1" ...>
                <BaseURL>video1.mp4</BaseURL>
                <SegmentList ... >
                    ......
                    <SegmentURL .../>
                    ......
            </SegmentList>
        </Representation>
            </AdaptationSet>
            <AdaptationSet ...> -- Audio1
                <Representation id="repId-2" ...>
                    <BaseURL>audio1.mp4</BaseURL>
                    <SegmentList ... >
                        ......
                        <SegmentURL .../>
                        ......
    </SegmentList>
    </Representation>
            </AdaptationSet>
    </Period>
</MPD>
```

In the extended MPD file, an extended SMIL file reference attribute "smilRef="http://a.com/smil-1.smil"" is arranged in the MPD element. In the use case 1, an extended SMIL file (smil-1.smil) of the following content is acquired from the presentation control information generation server 15 (or DASH MPD server 12) based on the extended SMIL file reference attribute.

```
<smil>
    <head>
--Description on content layout and overlapping manner?
        <layout>
--Designation of background size of layout?
            <region id=" View1" width=" 1920px" height=" 1080px"
>
--Information on layout from upper left is arranged on
top, left --
            <region id=" Area1" top=" 0px" left=" 0px" width="
1440px" height=" 810px" >
            <region id=" Area2" top=" 810px" left=" 0px"
width=" 1920px" height=" 270px" >
            <region id=" Area3" top=" 0px" left=" 1440px"
width=" 480px" height=" 810px" >
            <region id=" Area4" top=" 0px" left=" 1440px"
width=" 480px" height=" 410px" >
            <region id=" Area5" top=" 410px" left=" 1440px"
width=" 480px" height=" 400px" >
            </region>
        </layout>
    </head>
    <body>
--Description on content display method etc.--
--Does par become a tag for simultaneous reproduction?
        <par xmlns:xlink=" http://www.w3.org/1999/xlink" >
            <ref xlink:type="locator"
xlink:href="http://a.com/mpd-1.mpd#repId-1"
```

```
region="Area1" begin="0"/> -- Video1
        <ref xlink:type="locator"
xlink:href="http://a.com/mpd-1.mpd#repId-2"
region="Area1" begin=" 0" /> -- Audio1
        <img id=" Image1" src="http://image1.jpg"
region="Area2" begin=" 0" end=" 18:00" /> -- Image1
        <img id=" Image2" src="http://image2.jpg"
region="Area3" begin=" 0" > -- Image2
        <img id=" Image3" src="http://image3.jpg"
region="Area3" begin=" Image1.endEvent" /> -- Image3
        <ref id=" Widget1" src=" http://widget1.bt"
region="Area4" begin=" Image2.click" /> -- Widget1
        <img id=" Image4" src="http://image4.jpg"
region="Area5" begin=" Image2.click" /> -- Image4
    </par>
  </body>
</smil>
```

There are a header (head) element describing a content layout and an overlapping manner and a body element describing a content display method and the like below the SMIL element. Below the header (head) element, a layout element for designating a background size of the layout is arranged.

In the layout element, the size of the parent presentation element (region) indicated as "region id="View1"" is designated as "width="1920 px" height="1080 px"". Further, in the layout element, the size and position of the child presentation element (region) included in View 1 are designated.

In this case, the size and position of the child presentation element (region) indicated by "region id="Area1"" are designated as "top="0 px" left="0 px" width="1440 px" height="810 px"". Here, "top="0 px" left="0 px"" expresses the upper left position as an offset value with the upper left of the parent presentation element (region) being a base point.

Moreover, the size and position of the child presentation element (region) indicated by "region id="Area2"" are designated as "top="810 px" left="0 px" width="1920 px" height="270 px"". In addition, the size and position of the child presentation element (region) indicated by "region id="Area3"" are designated as "top="0 px" left="1440 px" width="480 px" height="810 px"".

Moreover, the size and position of the child presentation element (region) indicated by "region id="Area4"" are designated as "top="0 px" left="1440 px" width="480 px" height="410 px"". In addition, the size and position of the child presentation element (region) indicated by "region id="Area5"" are designated as "top="410 px" left="1440 px" width="480 px" height="400 px"".

Furthermore, in the body element, a presentation (display) content of each area and the like are designated. "par" indicates that the presentation contents are reproduced at the same time. It should be noted that although not used herein, "seq" indicates that the presentation contents are reproduced sequentially.

"<ref xlink:type="locator" xlink:href="http://a.com/mpd-1.mpd#repId-1" region="Area1" begin="0"/>—Video1" indicates that Video 1 (Video1) is to be displayed in Area 1 (Area1), video data therefor is to be acquired by referencing the Representation element (repId-1) of the extended MPD file (mpd-1.mpd), and the reproduction is to be started from the beginning.

In this case, a name space called "xlink" is defined so as to extend the SMIL element. "xlink" has a function of defining "where, in a certain other sentence, a reference is being made". "xlink" is one of the regulations of W3C (World Wide Web Consortium).

"ref" indicates a presentation content type but can also cope with any of the presentation contents of video, audio, and the like. In the name space called "xlink" regarding "ref", "locator" indicates the position of the reference information of the presentation content to be placed herein using the attribute of "type" defined by "xlink".

In this case, using the attribute "href" defined in "xlink", it is indicated that the position of the reference information is the Representation element (repId-1) of the extended MPD file (mpd-1.mpd). "a.com" indicates a server name of the DASH MPD server 12 storing the extended MPD file (mpd-1.mpd). It should be noted that the Representation element (repId-1) of the extended MPD file (mpd-1.mpd) includes information on an address (url) for acquiring a segment series as a chunk of the video file (video1 .mp4).

Further, "<ref xlink:type="locator" xlink:href="http://a.com/mpd-1.mpd#repId-2" region="Area1" begin="0"/>—Audio1" indicates that Audio 1 (Audio1) is to be displayed in Area 1 (Area1), audio data therefor is to be acquired by referencing the Representation element (repId-2) of the extended MPD file (mpd-1.mpd), and the reproduction is to be started from the beginning.

Further, "<img id="Image1" src="http://image1.jpg" region="Area2" begin="0" end="18:00"/>—Image1" indicates that Image 1 (Image1) is to be displayed in Area 2 (Area2), image (still image) data therefor is to be acquired from the address "http://image1.jpg", the reproduction is to be started from the beginning, and the reproduction is to be ended at 6 PM.

Moreover, "<img id="Image2" src="http://image2.jpg" region="Area3" begin="0">—Image2" indicates that Image 2 (Image2) is to be displayed in Area 3 (Area3), image (still image) data therefor is to be acquired from the address "http://image2.jpg", and the reproduction is to be started from the beginning.

"<img id="Image3" src="http://image3.jpg" region="Area3" begin="Image1.endEvent"/>—Image3" indicates that Image 3 (Image3) is to be displayed in Area 3 (Area3), image (still image) data therefor is to be acquired from the address "http://image3.jpg", and the reproduction is to be started after ending the reproduction of Image 1 (Image1).

Moreover, "<ref id="Widget1" src="http://widget1.bt" region="Area4" begin="Image2.click"/>—Widget1" indicates that Widget 1 (Widget1) is to be displayed in Area 4 (Area4), widget data therefor is to be acquired from the address "http://widget1.bt", and the reproduction is to be started after a click operation is made on Image 2 (Image2).

Moreover, "<img id="Image4" src="http://image4.jpg" region="Area5" begin="Image2.click"/>—Image4" indicates that Image 4 Image4 is to be displayed in Area 5 Area5, image (still image) data therefor is to be acquired from the address "http://image4.jpg", and the reproduction is to be started after a click operation is made on Image 2 (Image2).

Figure 11:
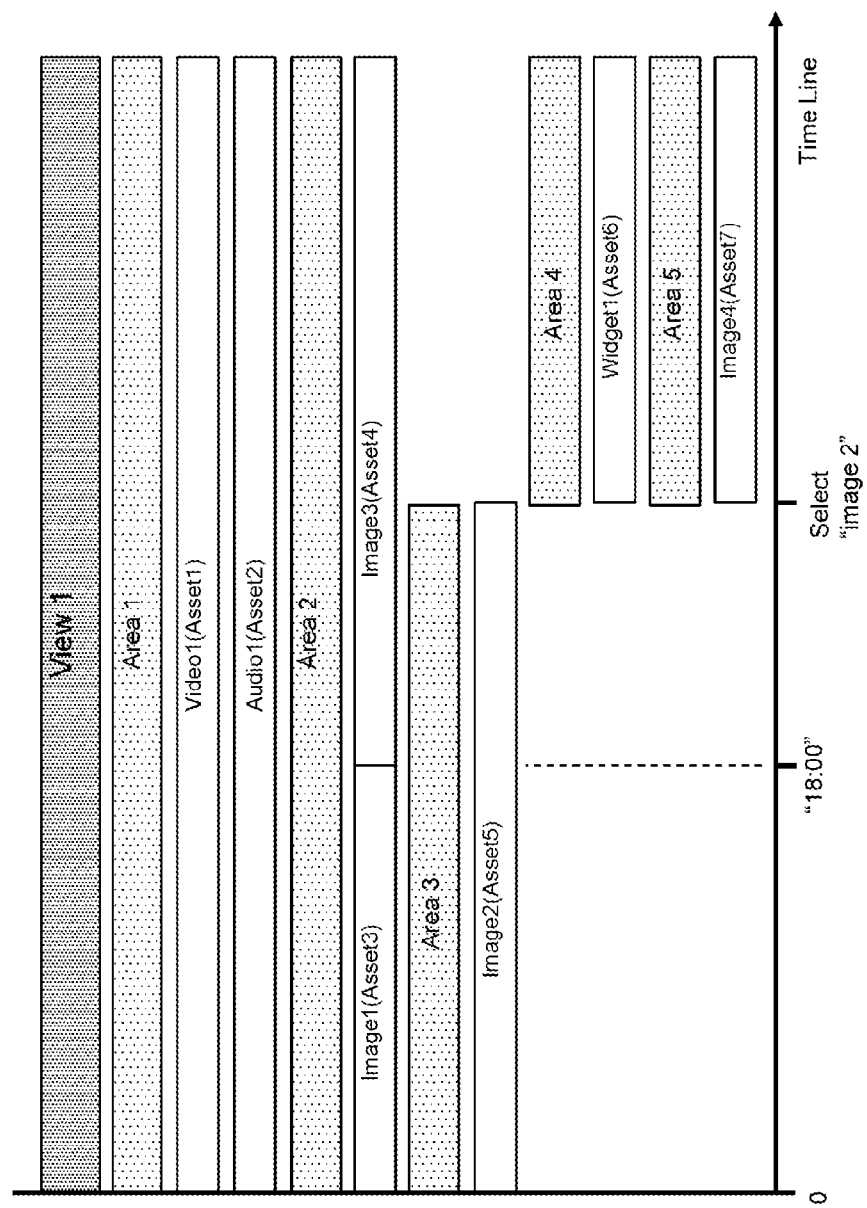
FIG. 11. A diagram showing an example of a relationship between a time lapse and a display content transition based on control of an extended SMIL element.

FIG. 11 shows a relationship between a time lapse and a display content transition based on control of the extended SMIL element. First, Video 1 and Audio 1 are displayed in Area 1, Image 1 is displayed in Area 2, and Image 2 is displayed in Area 3 (see FIG. 12(a)). Then, at 6 PM, Area 2 changes to a state where Image 3 is displayed.

Figure 12:
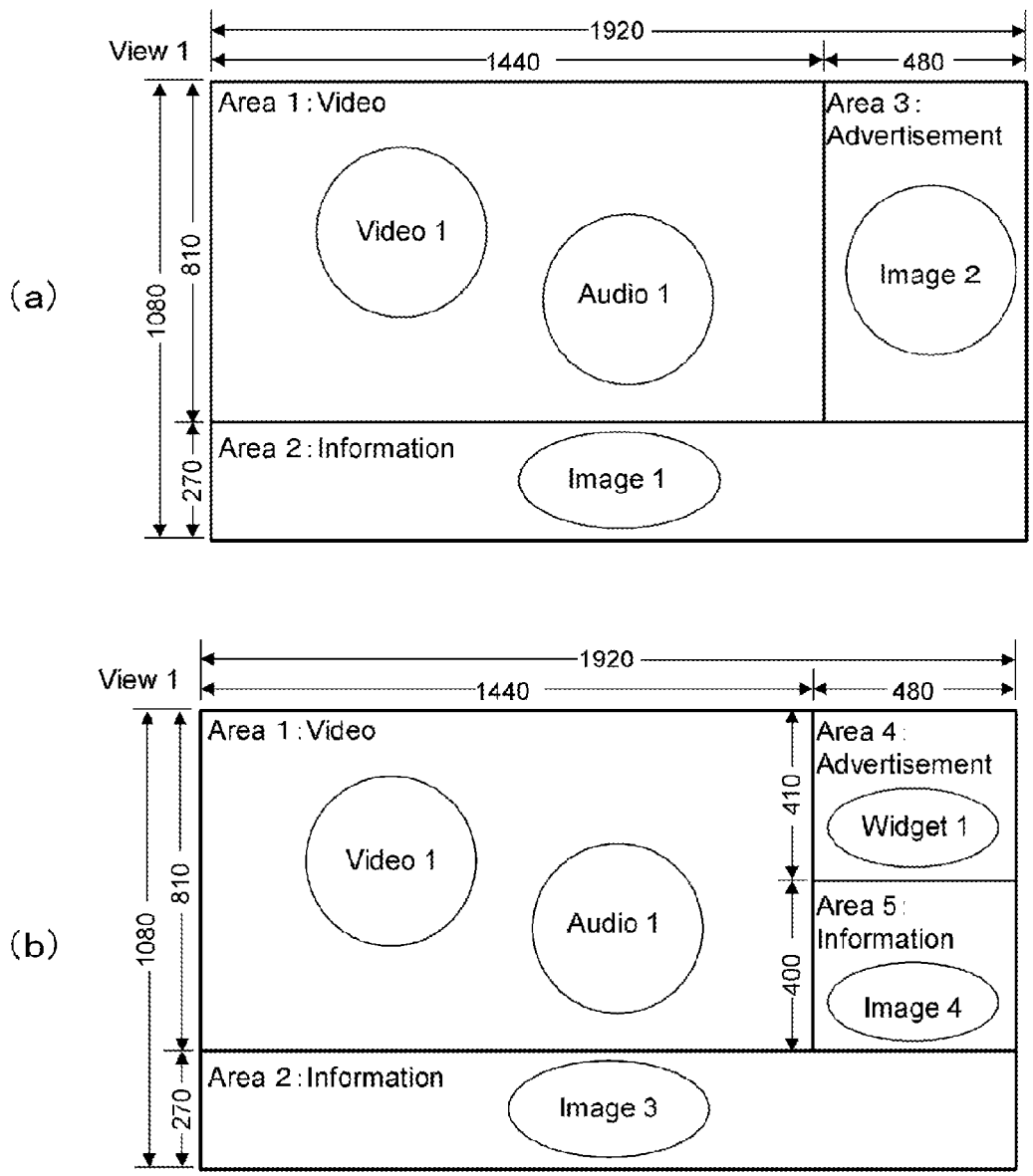
FIG. 12. Diagrams showing a display example of a presentation device for explaining a use case 1.

Further, when a user makes a click operation on Image 2 (Image2), Area 3 is divided into Areas 4 and 5, Widget 1 is displayed in Area 4, and Image 4 is displayed in Area 5 (see FIG. 12(b)). It should be noted that FIG. 12(b) shows a state after 6 PM, and Area 2 is changed to a state where Image 3 is displayed. In the state before 6 PM, Area 2 displays Image 1.

It should be noted that the descriptions on the use case 1 above have taken the case of acquiring the extended SMIL-reference extended MPD file (mpd-1.mpd) from the DASH MPD server 12 as an example. Although detailed descriptions will be omitted, the same operation is carried out in the case of acquiring an extended SMIL-inclusive extended MPD file (mpd-1.mpd) from the DASH MPD server 12. The same holds true for other use cases below. Incidentally, the extended SMIL-inclusive extended MPD file in the case of the use case 1 is as follows. It should be noted that in this case, the description of "http://a.com/mpd-1.mpd" as the address information of the MPD file is omitted.

```
<MPD ...>
    <BaseURL>http://example.com/</BaseURL>
    <Period ...>
        <AdaptationSet ...> -- Video1
            Representation id="repId-1" ...>
                <BaseURL>video1.mp4</BaseURL>
                <SegmentList ... >
                    ......
                    <SegmentURL .../>
                    ......
</SegmentList>
</Representation>
        </AdaptationSet>
        <AdaptationSet ...> -- Audio1
            <Representation id="repId-2" ...>
                <BaseURL>audio1.mp4</BaseURL>
                <SegmentList ... >
                    ......
                    <SegmentURL .../>
                    ......
</SegmentList>
</Representation>
        </AdaptationSet>
    </Period>
    <smil>
        <head>
            <layout>
                <region id=" View1" width=" 1920px" height=" 1080px" >
                    <region id=" Area1" top=" 0px" left=" 0px" width=" 1440px" height=" 810px" >
                    <region id=" Area2" top=" 810px" left=" 0px" width=" 1920px" height=" 270px" >
                    <region id=" Area3" top=" 0px" left=" 1440px" width=" 480px" height=" 810px" >
                    <region id=" Area4" top=" 0px" left=" 1440px" width=" 480px" height=" 410px" >
                    <region id=" Area5" top=" 410px" left=" 1440px" width=" 480px" height=" 400px" >
                </region>
            </layout>
        </head>
        <body>
            <par xmlns:xlink=" http://www.w3.org/1999/xlink" >
                <ref xlink:type="locator" xlink:href="#repId-1" region="Area1" begin="0"/> -- Video1
                <ref xlink:type="locator" xlink:href="#repId-2" region="Area1" begin="0"/> -- Audio1
                <img id=" Image1" src="http://image1.jpg" region="Area2" begin=" 0" end=" 18:00" /> -- Image1
                <img id=" Image2" src="http://image2.jpg" region="Area3" begin=" 0" > -- Image2
                <img id=" Image3" src="http://image3.jpg" region="Area3" begin=" Image1.endEvent" /> -- Image3
                <ref id=" Widget1" src=" http://widget1.bt" region="Area4" begin=" Image2.click" /> -- Widget1
                <img id=" Image4" src="http://image4.jpg" region="Area5" begin=" Image2.click" /> -- Image4
            </par>
        </body>
    </smil>
</MPD>
```

[Use Case 2 (View Change)]

In a use case 2, the extended SMIL-reference extended MPD file (mpd-2.mpd) as follows is acquired from the DASH MPD server 12.

```
<MPD ... smilRef=" http://a.com/smil-2.smil" >
    <BaseURL>http://example.com/</BaseURL>
    <Period ...>
        <AdaptationSet ...> -- Video1
            <Representation id="repId-v1" ...>
                <BaseURL>video1.mp4</BaseURL>
            ......
        </AdaptationSet>
        <AdaptationSet ...> -- Audio1
            <Representation id="repId-a1" ...>
                <BaseURL>audio1.mp4</BaseURL>
            ......
        </AdaptationSet>
        <AdaptationSet ...> -- Video2
            <Representation id="repId-v2" ...>
                <BaseURL>video2.mp4</BaseURL>
            ......
        </AdaptationSet>
        <AdaptationSet ...> -- Video3
            <Representation id="repId-v3" ...>
                <BaseURL>video3.mp4</BaseURL>
            ......
        </AdaptationSet>
        <AdaptationSet ...> -- Video4
            <Representation id="repId-v4" ...>
                <BaseURL>video4.mp4</BaseURL>
            ......
        </AdaptationSet>
    </Period>
</MPD>
```

In the extended MPD file, the extended SMIL file reference attribute "smilRef="http://a.com/smil-2.smil" is arranged in the MPD element. In the use case 2, the extended SMIL file (smil-2.smil) of the following content is acquired from the presentation control information generation server 15 (or DASH MPD server 12) based on the extended SMIL file reference attribute.

```
<smil>
    <head>
        <layout>
            <region id="View1" width="1920px" height="1080px" begin="0" end="Image1.click">
                <region id="Area1" top="0px" left=" 0px" width=" 1440px" height=" 810px" >
                <region id=" Area2" top=" 810px" left=" 0px" width=" 1920px" height=" 270px" >
                <region id=" Area3" top=" 0px" left=" 1440px" width=" 480px" height=" 810px" >
            </region>
            <region id=" View2" width=" 1920px" height=" 1080px" begin="Image1.click" >
                <region id=" Area1" top=" 0px" left=" 0px" width=" 960px" height=" 540px" >
                <region id=" Area4" top=" 0px" left=" 960px" width=" 960px" height=" 540px" >
                <region id=" Area5" top=" 540px" left=" 0px" width=" 960px" height=" 540px" >
                <region id=" Area6" top=" 540px" left=" 960px"
```

```
            width=" 960px" height=" 540px" >
          </region>
        </layout>
      </head>
      <body>
        <par xmlns:xlink=" http://www.w3.org/1999/xlink" >
          <ref xlink:type="locator"
xlink:href="http://a.com/mpd-2.mpd#repId-v1"
region="Area1" begin="0"/> -- Video1
          <ref xlink:type="locator"
xlink:href="http://a.com/mpd-2.mpd#repId-a1"
region="Area1" begin="0" /> -- Audio1
          <img id=" Image1" src="http://image1.jpg"
region="Area2" begin=" 0" /> -- Image1
          <ref id=" Widget1" src=" http://widget1.bt"
region="Area3" begin=" 0" /> -- Widget1
          <ref xlink:type="locator"
xlink:href="http://a.com/mpd-2.mpd#repId-v2"
region="Area4" begin="0"/> -- Video2
          <ref xlink:type="locator"
xlink:href="http://a.com/mpd-2.mpd#repId-v3"
region="Area5" begin="0"/> -- Video3
          <ref xlink:type="locator"
xlink:href="http://a.com/mpd-2.mpd#repId-v4"
region="Area6" begin=" 0" /> -- Video4
        </par>
      </body>
    </smil>
```

Below the SMIL element, there are a header (head) element describing the content layout and an overlapping manner and a body element describing a content display method and the like. Below the header (head) element, a layout element for designating a background size of the layout is arranged.

In the layout element, the size of the parent presentation element (region) indicated as "region id="View1"" is designated as "width="1920 px" height="1080 px"". Further, "begin="0" end="Image1.click"" is arranged as the presentation time information of View 1 (View1), thus indicating that View 1 (View1) is displayed from the start until a click operation is made on Image 1 (Image1).

In the layout element, the size and position of the child presentation element (region) included in View 1 (View1) are designated. In this case, the size and position of the child presentation element (region) indicated by "region id="Area1"" are designated as "top="0 px" left="0 px" width="1440 px" height="810 px"". Here, "top="0 px" left="0 px"" expresses the upper left position as an offset value with the upper left of the parent presentation element (region) being a base point.

Moreover, the size and position of the child presentation element (region) indicated by "region id="Area1"" are designated as "top="810 px" left="0 px" width="1920 px" height="270 px"". In addition, the size and position of the child presentation element (region) indicated by "region id="Area3"" are designated as "top="0 px" left="1440 px" width="480 px" height="810 px"".

In the layout element, the size of the parent presentation element (region) indicated as "region id="View2"" is designated as "width="1920 px" height="1080 px"". Further, "begin="Image1.click"" is arranged as the presentation time information of View 2 (View2), thus indicating that the display of View 1 (View1) is to be started by a click operation on Image 1 (Image1).

In the layout element, the size and position of the child presentation element (region) included in View 2 (View2) are designated. In this case, the size and position of the child presentation element (region) indicated by "region id="Area1"" are designated as "top="0 px" left="0 px" width="960 px" height="540 px"". Here, "top="0 px" left="0 px"" expresses the upper left position as an offset value with the upper left of the parent presentation element (region) being a base point.

Moreover, the size and position of the child presentation element (region) indicated by "region id="Area4"" are designated as "top="0 px" left="960 px" width="960 px" height="540 px"". In addition, the size and position of the child presentation element (region) indicated by "region id="Area5"" are designated as "top="540 px" left="0 px" width="960 px" height="540 px"". Furthermore, the size and position of the child presentation element (region) indicated by "region id="Area6"" are designated as "top="540 px" left="960 px" width="960 px" height="540 px"".

Furthermore, in the body element, a presentation (display) content and the like of each area are designated. "<ref xlink:type="locator" xlink:href="http://a.com/mpd-2.mpd#repId-v1" region="Area1" begin="0"/>—Video1" indicates that Video 1 (Video1) is to be displayed in Area 1 (Area1), video data therefor is to be acquired by referencing the Representation element (repId-v1) of the extended MPD file (mpd-2.mpd), and the reproduction is to be started from the beginning.

Moreover, "<ref xlink:type="locator" xlink:href="http://a.com/mpd-2.mpd#repId-a1" region="Area1" begin="0"/>—Audio1" indicates that Audio 1 (Audio1) is to be displayed in Area 1 (Area1), audio data therefor is to be acquired by referencing the Representation element (repId-a1) of the extended MPD file (mpd-2.mpd), and the reproduction is to be started from the beginning.

Moreover, "<img id="Image1" src="http://image1.jpg" region="Area2" begin="0"/>—Image1" indicates that Image 1 (Image1) is to be displayed in Area 2 (Area2), image (still image) data therefor is to be acquired from the address "http://image1.jpg", and the reproduction is to be started from the beginning.

Further, "<ref id="Widget1" src="http://widget1.bt" region="Area3" begin="0"/>—Widget1" indicates that Widget 1 (Widget1) is to be displayed in Area 3 (Area3), widget data therefor is to be acquired from the address "http://widget1.bt", and the reproduction is to be started from the beginning.

Furthermore, "<ref xlink:type="locator" xlink:href="http://a.com/mpd-2.mpd#repId-v2" region="Area4" begin="0"/>—Video2" indicates that Video 2 (Video2) is to be displayed in Area 4 (Area4), video data therefor is to be acquired by referencing the Representation element (repId-v2) of the extended MPD file (mpd-2.mpd), and the reproduction is to be started from the beginning.

Further, "<ref xlink:type="locator" xlink:href="http://a.com/mpd-2.mpd#repId-v3" region="Area5" begin="0"/>—Video3" indicates that Video 3 (Video3) is to be displayed in Area 5 (Area5), video data therefor is to be acquired by referencing the Representation element (repId-v3) of the extended MPD file (mpd-2.mpd), and the reproduction is to be started from the beginning.

Further, "<ref xlink:type="locator" xlink:href="http://a.com/mpd-2.mpd#repId-v4" region="Area6" begin="0"/>—Video4" indicates that Video 4 (Video4) is to be displayed in Area 6 (Area6), video data therefor is to be acquired by referencing the Representation element (repId-v4) of the extended MPD file (mpd-2.mpd), and the reproduction is to be started from the beginning.

Figure 13:
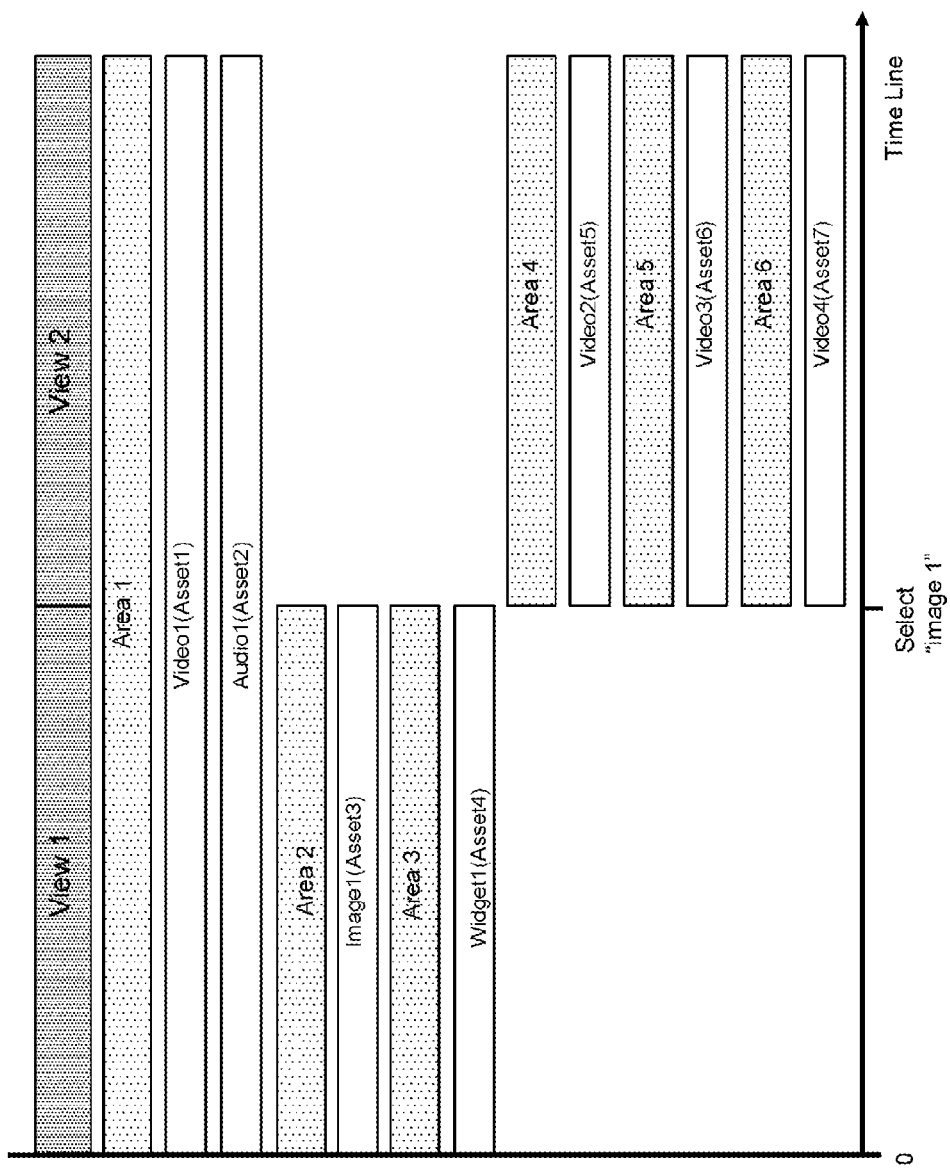
FIG. 13. A diagram showing an example of a relationship between a time lapse and a display content transition based on the control of an extended SMIL element.

FIG. 13 shows a relationship between a time lapse and a display content transition based on the control of the extended SMIL element. First, View 1 (View1) is displayed.

Figure 14:
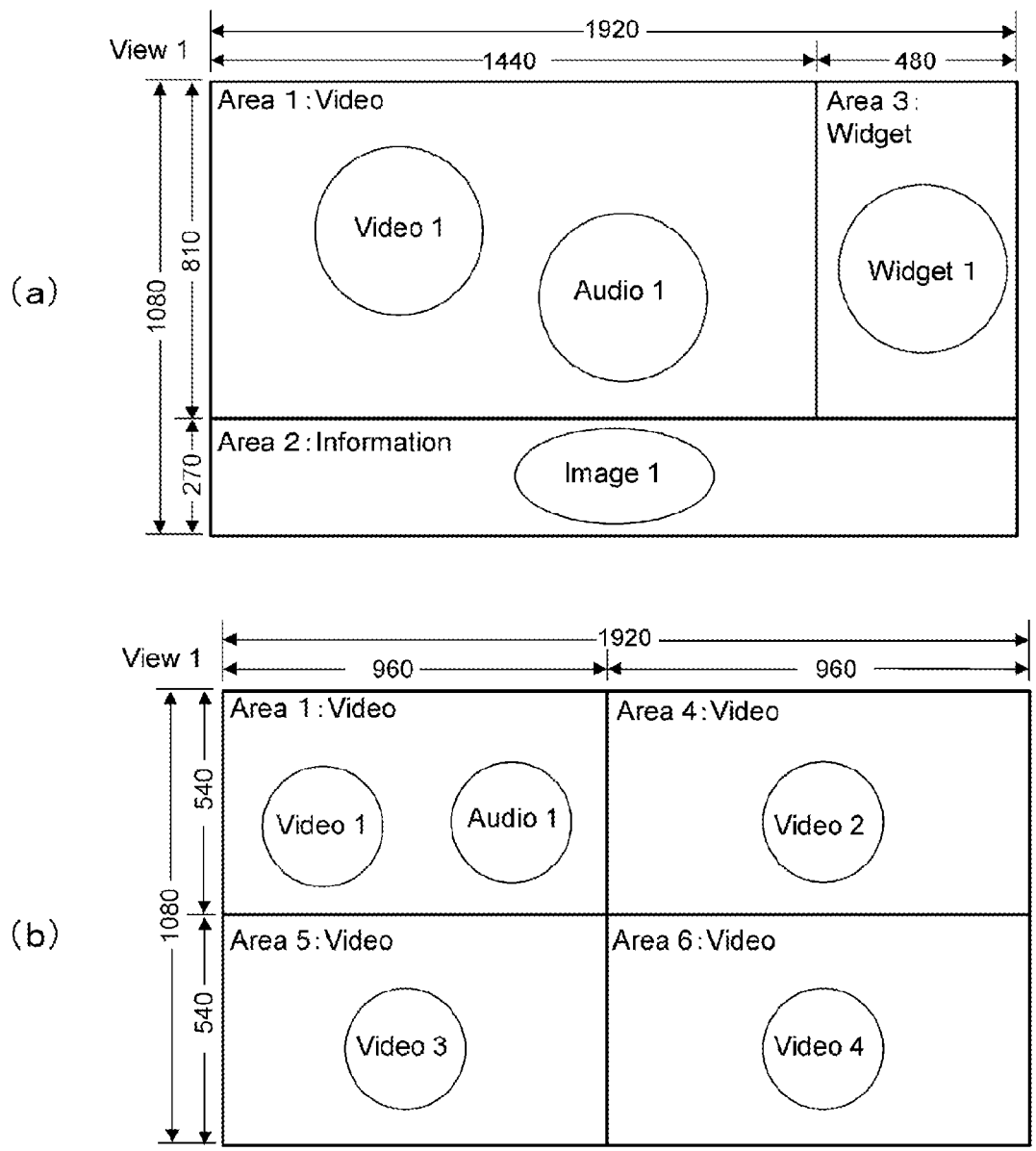
FIG. 14. Diagrams showing a display example of the presentation device for explaining a use case 2.

Specifically, Video 1 and Audio 1 are displayed in Area 1, Image 1 is displayed in Area 2, and Widget 1 is displayed in Area 3 (see FIG. 14(*a*)).

Then, when a user makes a click operation on Image 1 (Image1), a transition is made to a display state of View 2 (View2). Specifically, Video 1 and Audio 1 are displayed in Area 1, Video 2 is displayed in Area 4, Video 3 is displayed in Area 5, and Video 4 is displayed in Area 6 (see FIG. 14(*b*)).

In this case, the reproduction of Video 1 and Audio 1 in Area 1 is continued. In addition, Videos 2, 3, and 4 of Areas 4, 5, and 6 are reproduced in sync with Video 1. In other words, reproduction of Videos 2, 3, and 4 is started simultaneous with Video 1, but the videos are not displayed until the transition is made to View 2.

"Use Case 3 (Multi-Screen Presentation? Asset Sharing)"

In a use case 3, an extended SMIL-reference extended MPD file (mpd-3.mpd) as follows is acquired from the DASH MPD server 12.

```
<MPD ... smilRef="http://a.com/smil-3.smil" >
  <BaseURL>http://example.com/</BaseURL>
  <Period ...>
    <AdaptationSet ...> -- Video1
      <Representation id="repId-1" ...>
        <BaseURL>video1.mp4</BaseURL>
        ......
    </AdaptationSet>
    <AdaptationSet ...> -- Video2
      <Representation id="repId-2" ...>
        <BaseURL>video2.mp4</BaseURL>
        ......
    </AdaptationSet>
  </Period>
</MPD>
```

In the extended MPD file, an extended SMIL file reference attribute "smilRef="http://a.com/smil-3.smil" is arranged in the MPD element. In the use case 3, an extended SMIL file (smil-3.smil) of the following content is acquired from the presentation control information generation server 15 (or DASH MPD server 12) based on the extended SMIL file reference attribute.

```
<smil>
 <head>
  <switch>
   <layout system-device-class="DeviceClass01">
    <region id=" View1" width=" 1920px" height=" 1080px" >
     <region id=" Area1" top=" 0%" left=" 0%" width=" 70%" height=" 100%" >
     <region id=" Area2" top=" 0%" left=" 70%" width=" 30%" height=" 100%" >
    </region>
   </layout>
   <layout system-device-class="DeviceClass02">
    <region id=" View2" width=" 1024px" height=" 768px" >
     <region id=" Area2" top=" 0%" left=" 0%" width=" 100%" height=" 100%" >
    </region>
   </layout>
  </switch>
 </head>
 <body>
  <par xmlns:xlink=" http://www.w3.org/1999/xlink" >
   <ref xlink:type="locator"
xlink:href="http://a.com/mpd-3.mpd#repId-1"
region="Area1" begin="0"/> -- Video1
   <ref xlink:type="locator"
xlink:href="http://a.com/mpd-3.mpd#repId-2"
region="Area2" begin="0"/> -- Video2
  </par>
 </body>
</smil>
```

There are a header (head) element describing a content layout and an overlapping manner and a body element describing a content display method and the like below the SMIL element. A switch element is arranged below the header (head) element, and a layout element for designating a background size of the layout is arranged below that. The switch element means a selective use from a plurality of layout elements.

Here, there are layout elements respectively corresponding to a plurality of presentation device types. In this example, layout elements of Device Class 1 (DeviceClass01) and Device Class 2 (DeviceClass02) are arranged.

In the layout element of Device Class 1 (DeviceClass01), the size of the parent presentation element (region) indicated as "region id="View1"" is designated as "width="1920 px" height="1080 px"". In the layout element, the size and position of the child presentation element (region) included in View 1 (View1) are designated.

In this case, the size and position of the child presentation element (region) indicated by "region id="Area1"" are designated as "top="0%" left="0%" width="70%" height="100%"". Here, "top="0%" left="0%"" expresses the upper left position as an offset value with the upper left of the parent presentation element (region) being a base point. Moreover, the size and position of the child presentation element (region) indicated by "region id="Area1"" are designated as "top="0%" left="70%" width="30%" height="100%"".

In the layout element of Device Class 2 (DeviceClass02), the size of the parent presentation element (region) indicated as "region id="View2"" is designated as "width="1024 px" height="768 px"". In the layout element, the size and position of the child presentation element (region) included in View 2 (View2) are designated. In this case, the size and position of the child presentation element (region) indicated by "region id="Area2"" are designated as "top="0%" left="0%" width="100%" height="100%"". Here, "top="0%" left="0%"" expresses the upper left position as an offset value with the upper left of the parent presentation element (region) being a base point.

Furthermore, in the body element, a presentation (display) content of each area and the like are designated. "<ref xlink:type="locator" xlink:href="http://a.com/mpd-3.mpd#repId-1" region="Area1" begin="0"/>—Video1" indicates that Video 1 (Video1) is to be displayed in Area 1 (Area1), video data therefor is to be acquired by referencing the Representation element (repId-1) of the extended MPD file (mpd-3.mpd), and the reproduction is to be started from the beginning.

Moreover, "<ref xlink:type="locator" xlink:href="http://a.com/mpd-3.mpd#repId-2" region="Area2" begin="0"/>—Video2" indicates that Video 2 (Video2) is to be displayed in Area 2 (Area2), video data therefor is to be acquired by referencing the Representation element (repId-2) of the extended MPD file (mpd-3.mpd), and the reproduction is to be started from the beginning.

Figure 15:
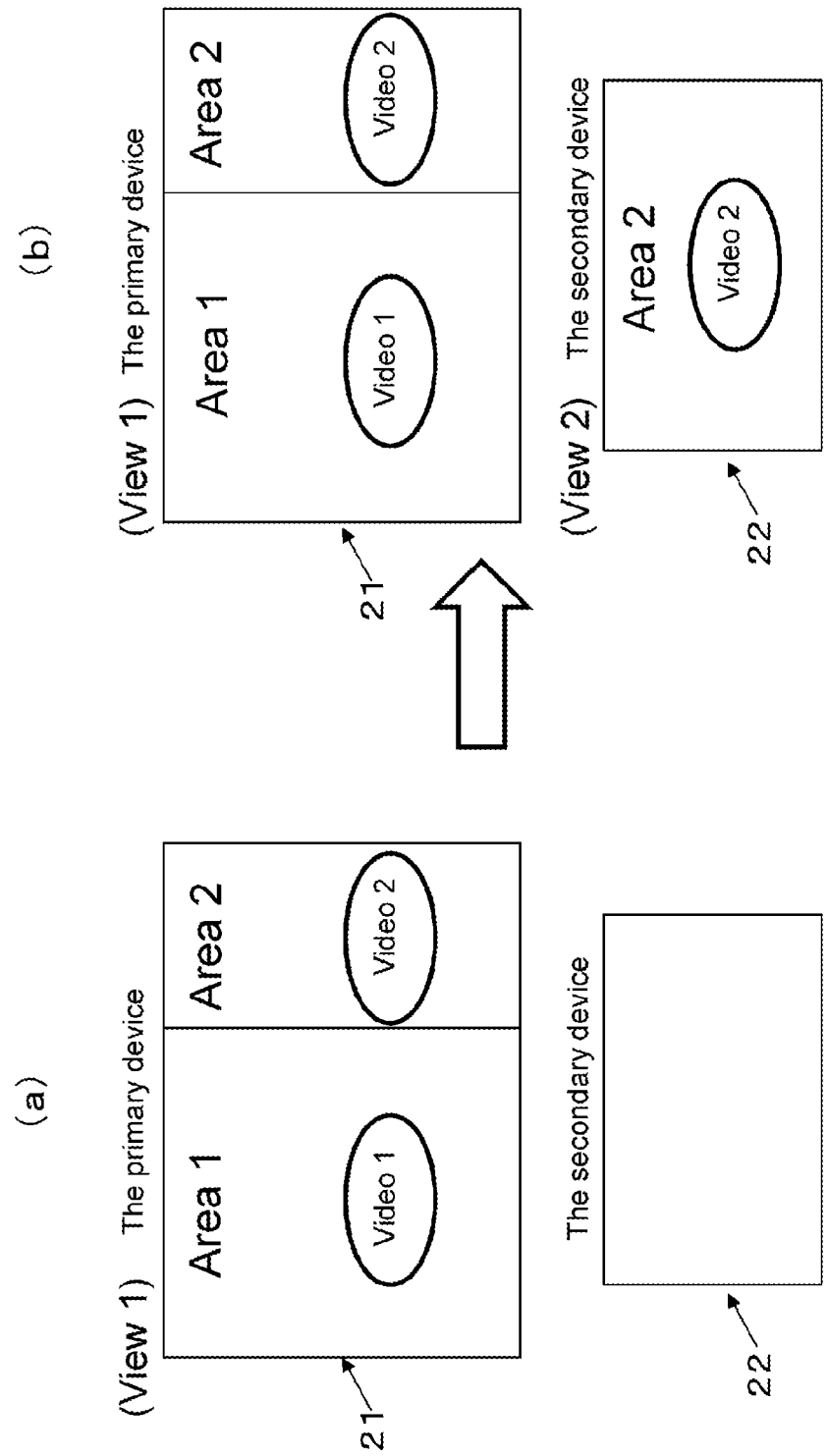
FIG. 15. Diagrams showing a display example of the presentation device for explaining a use case 3.

Here, a case where there are a primary device (The primary device) 21 and a secondary device (The secondary device) 22 as the IPTV clients 13 as shown in FIG. 15 will be discussed. The primary device 21 is a presentation device corresponding to Device Class 1 (DeviceClass01), such as a television receiver. The secondary device 22 is a presentation device corresponding to Device Class 2 (DeviceClass02), such as a tablet.

FIG. 15(*a*) shows a state where power of the primary device 21 is on and power of the secondary device 22 is off. In this state, only the primary device 21 acquires an extended MPD file (mpd-3.mpd) from the DASH MPD server 12 and acquires an extended SMIL file (smil-3.smil) from the presentation control information generation server 15 (or DASH MPD server 12) based on the extended SMIL file reference attribute in the extended MPD file.

Since the primary device 21 is a presentation device corresponding to Device Class 1 (DeviceClass01), display corresponding to the layout element of Device Class 1 included in the extended SMIL file (smil-3.smil) is performed. Specifically, Video 1 is displayed in Area 1, and Video 2 is displayed in Area 2.

FIG. 15(*b*) shows a state where the power of the secondary device 22 is also turned on. In this state, regarding the primary device 21, the same display state as that shown in FIG. 15(*a*) is maintained. The secondary device 22 acquires an extended MPD file (mpd-3.mpd) from the DASH MPD server 12 and acquires an extended SMIL file (smil-3.smil) from the presentation control information generation server 15 (or DASH MPD server 12) based on the extended SMIL file reference attribute in the extended MPD file.

Since the secondary device 22 is a presentation device corresponding to Device Class 2 (DeviceClass02), display corresponding to the layout element of Device Class 2 included in the extended SMIL file (smil-3.smil) is performed. Specifically, Video 2 is displayed in Area 2.

It should be noted that the state shown in FIG. 15(*a*) is changed to the state shown in FIG. 15(*b*) as the power of the secondary device 22 is turned on. However, the change may be made according to an occurrence of other events. For example, in the secondary device 22 that is powered on, the change may be made when a positive response operation is made by a user in response to an inquiry on whether to display Area 2. Moreover, the change may be made when reaching a predetermined preset time, for example.

In the case of the use case 3, simultaneous with the transition to the multi-screen presentation, a partial area of the primary screen can be shared with the secondary screen.

"Use Case 4 (Multi-Screen Presentation? Dynamic Asset Sharing)"

In a use case 4, an extended SMIL-reference extended MPD file (mpd-4.mpd) as follows is acquired from the DASH MPD server 12.

```
<MPD ...smilRef="http://a.com/smil-4.smil" >
  <BaseURL>http://example.com/</BaseURL>
  <Period ...>
    <AdaptationSet ...> -- Video1
      <Representation id="repId-1" ...>
        <BaseURL>video1.mp4</BaseURL>
        ......
    </AdaptationSet>
    <AdaptationSet ...> -- Video2
      <Representation id="repId-2" ...>
        <BaseURL>video2.mp4</BaseURL>
        ......
    </AdaptationSet>
  </Period>
</MPD>
```

In the extended MPD file, an extended SMIL file reference attribute "smilRef="http://a.com/smil-4.smil" is arranged in the MPD element. In the use case 4, an extended SMIL file (smil-4.smil) of the following content is acquired from the presentation control information generation server 15 (or DASH MPD server 12) based on the extended SMIL file reference attribute.

```
<smil>
  <head>
    <switch>
      <layout system-device-class="DeviceClass01">
        <region id=" View1" width=" 1920px" height=" 1080px" >
          <region id=" Area1" top=" 0%" left=" 0%" width=" 70%" height=" 100%" >
          <region id=" Area2" top=" 0%" left=" 70%" width=" 30%" height=" 100%" >
        </region>
        <region id=" View3" width=" 1920px" height=" 1080px" >
          <region id=" Area1" top=" 0%" left=" 15%" width=" 70%" height=" 100%" >
        </region>
      </layout>
      <layout system-device-class="DeviceClass02">
        <region id=" View2" width=" 1024px" height=" 768px" >
          <region id=" Area2" top=" 0%" left=" 0%" width=" 100%" height=" 100%" >
        </region>
      </layout>
    </switch>
  </head>
  <body>
    <par xmlns:xlink=" http://www.w3.org/1999/xlink" >
      <ref xlink:type="locator"
"xlink:href="http://a.com/mpd-4.mpd#repId-1"
region="Area1" begin="0"/> -- Video1
      <ref xlink:type="locator"
xlink:href="http://a.com/mpd-4.mpd#repId-2"
region="Area2" begin=" 0" /> -- Video2
    </par>
  </body>
</smil>
```

A switch (swich) element is arranged below the header (head) element, and a layout element for designating a background size of the layout is arranged below that. The switch (swich) element means a selective use from a plurality of layout elements.

Here, there are layout elements respectively corresponding to a plurality of presentation device types. In this example, layout elements of Device Class 1 (DeviceClass01) and Device Class 2 (DeviceClass02) are arranged.

In the layout element of Device Class 1 (DeviceClass01), the size of the parent presentation element (region) indicated as "region id="View1"" is designated as "width="1920 px" height="1080 px"". In the layout element, the size and position of the child presentation element (region) included in View 1 (View1) are designated.

In this case, the size and position of the child presentation element (region) indicated by "region id="Area1"" are designated as "top="0%" left="0%" width="70%" height="100%"". Here, "top="0%" left="0%"" expresses the upper left position as an offset value with the upper left of the parent presentation element (region) being a base point. Moreover, the size and position of the child presentation element (region) indicated by "region id="Area1"" are designated as "top="0%" left="70%" width="30%" height="100%"".

In the layout element of Device Class 1 (DeviceClass01), the size of the parent presentation element (region) indicated as "region id="View3"" is designated as "width="1920 px" height="1080 px"". In the layout element, the size and position of the child presentation element (region) included in View 3 (View3) are designated. In this case, the size and position of the child presentation element (region) indicated by "region id="Area1"" are designated as "top="0%" left="15%" width="70%" height="100%"".

In the layout element of Device Class 2 (DeviceClass02), the size of the parent presentation element (region) indicated as "region id="View2"" is designated as "width="1024 px" height="768 px"". In the layout element, the size and position of the child presentation element (region) included in View 2 (View2) are designated. In this case, the size and position of the child presentation element (region) indicated by "region id="Area2"" are designated as "top="0%" left="0%" width="100%" height="100%"". Here, "top="0%" left="0%"" expresses the upper left position as an offset value with the upper left of the parent presentation element (region) being a base point.

Furthermore, in the body element, a presentation (display) content of each area and the like are designated. "<ref xlink:type="locator" xlink:href="http://a.com/mpd-4.mpd#repId-1" region="Area1" begin="0"/>—Video1" indicates that Video 1 (Video1) is to be displayed in Area 1 (Area1), video data therefor is to be acquired by referencing the Representation element (repId-1) of the extended MPD file (mpd-4.mpd), and the reproduction is to be started from the beginning.

Moreover, "<ref xlink:type="locator" xlink:href="http://a.com/mpd-4.mpd#repId-2" region="Area2" begin="0"/>—Video2"" indicates that Video 2 (Video2) is to be displayed in Area 2 (Area2), video data therefor is to be acquired by referencing the Representation element (repId-2) of the extended MPD file (mpd-4.mpd), and the reproduction is to be started from the beginning.

Figure 16:
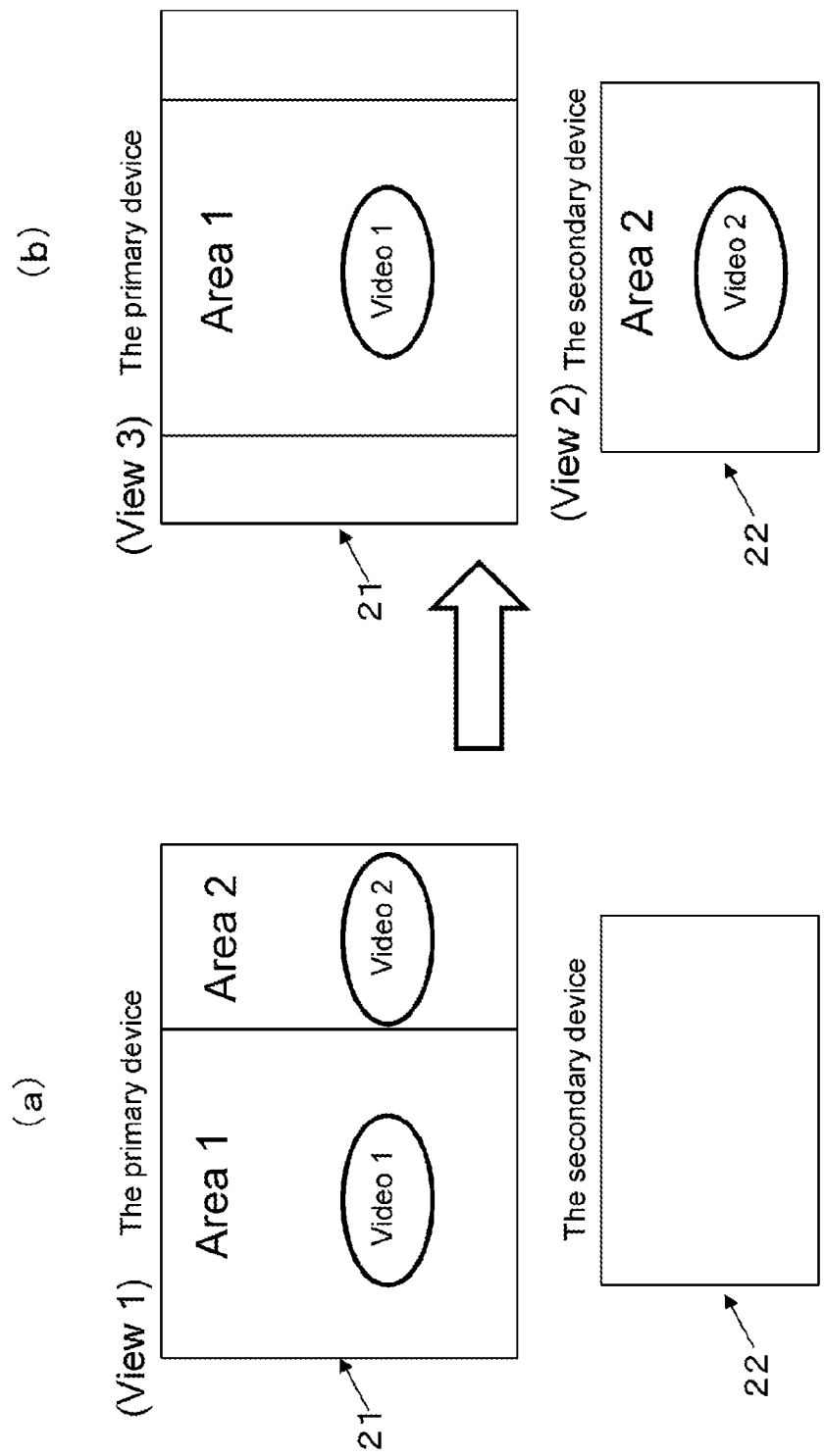
FIG. 16. Diagrams showing a display example of the presentation device for explaining a use case 4.

Here, a case where there are the primary device (The primary device) 21 and the secondary device (The secondary device) 22 as the IPTV clients 13 as shown in FIG. 16 will be discussed. The primary device 21 is a presentation device corresponding to Device Class 1 (DeviceClass01), such as a television receiver. The secondary device 22 is a presentation device corresponding to Device Class 2 (DeviceClass02), such as a tablet.

FIG. 16(a) shows a state where the power of the primary device 21 is on and the power of the secondary device 22 is off. In this state, only the primary device 21 acquires an extended MPD file (mpd-4.mpd) from the DASH MPD server 12 and acquires an extended SMIL file (smil-4.smil) from the presentation control information generation server 15 (or DASH MPD server 12) based on the extended SMIL file reference attribute in the extended MPD file.

Since the primary device 21 is a presentation device corresponding to Device Class 1 (DeviceClass01), display corresponding to the layout element of Device Class 1 included in the extended SMIL file (smil-4.smil) is performed. Specifically, Video 1 is displayed in Area 1, and Video 2 is displayed in Area 2.

FIG. 16(b) shows a state where the power of the secondary device 22 is also turned on. In this state, regarding the primary device 21, the state of displaying View 1 (View1) is changed to the state of displaying View 3 (View3). In this case, Video 1 is continuously displayed in Area 1 that has been moved to the center. The display change of the primary device 21 is performed automatically by an inter-device communication in sync with the display start of Video 2 in Area 2 in the secondary device 22 to be described later, for example.

The secondary device 22 acquires an extended MPD file (mpd-4.mpd) from the DASH MPD server 12 and acquires an extended SMIL file (smil-4.smil) from the presentation control information generation server 15 (or DASH MPD server 12) based on the extended SMIL file reference attribute in the extended MPD file.

Since the secondary device 22 is a presentation device corresponding to Device Class 2 (DeviceClass02), display corresponding to the layout element of Device Class 2 included in the extended SMIL file (smil-4.smil) is performed. Specifically, Video 2 is displayed in Area 2.

It should be noted that in the descriptions above, the state shown in FIG. 16(a) is changed to the state shown in FIG. 16(b) as the power of the secondary device 22 is turned on. However, the change may be made according to an occurrence of other events. For example, in the secondary device 22 that is powered on, the change may be made when a positive response operation is made by a user in response to an inquiry on whether to display Area 2. Moreover, the change may be made when reaching a predetermined preset time, for example.

In the case of the use case 4, simultaneous with the transition to the multi-screen presentation, a content drawing area as a part of the primary screen can be moved to the secondary screen. The content drawing area remaining on the primary screen is centered in the primary screen.

"Use Case 5 (Multi-Screen Presentation? Complementary Asset)"

In a use case 5, an extended SMIL-reference extended MPD file (mpd-5.mpd) as follows is acquired from the DASH MPD server 12.

```
<MPD ...smilRef="http://a.com/smil-5.smil" >
  <BaseURL>http://example.com/</BaseURL>
  <Period ...>
    <AdaptationSet ...> -- Video1
      <Representation id="repId-1" ...>
        <BaseURL>video1.mp4</BaseURL>
        ......
    </AdaptationSet>
    <AdaptationSet ...> -- Video2
      <Representation id="repId-2" ...>
        <BaseURL>video2.mp4</BaseURL>
        ......
    </AdaptationSet>
    <AdaptationSet ...> -- Video3
      <Representation id="repId-3" ...>
        <BaseURL>video3.mp4</BaseURL>
        ......
    </AdaptationSet>
  </Period>
</MPD>
```

In the extended MPD file, an extended SMIL file reference attribute "smilRef="http://a.com/smil-5.smil" is arranged in the MPD element. In the use case 5, an extended SMIL file (smil-5.smil) of the following content is acquired from the presentation control information generation server 15 (or DASH MPD server 12) based on the extended SMIL file reference attribute.

```
<smil>
  <head>
    <switch>
      <layout system-device-class="DeviceClass01">
        <region id="View1" width=" 1920px" height=" 1080px" >
          <region id=" Area1" top=" 0%" left=" 0%" width=" 70%" height=" 100%" >
          <region id=" Area2" top=" 0%" left=" 70%" width=" 30%" height=" 100%" >
```

-continued

```
        </region>
      </layout>
      <layout system-device-class="DeviceClass02">
        <region id=" View2" width=" 1024px"
height=" 768px" >
          <region id=" Area3" top=" 0%" left=" 0%"
width=" 100%" height=" 100%" >
          </region>
      </layout>
    </switch>
  </head>
  <body>
    <par xmlns:xlink=" http://www.w3.org/1999/xlink" >
      <ref xlink:type="locator"
xlink:href="http://a.com/mpd-5.mpd#repId-1"
region="Area1" begin="0"/> -- Video1
      <ref xlink:type="locator"
xlink:href="http://a.com/mpd-5.mpd#repId-2"
region="Area2" begin="0"/> -- Video2
      <ref xlink:type="locator"
xlink:href="http://a.com/mpd-5.mpd#repId-3"
region="Area3" begin=" 0" /> -- Video3
    </par>
  </body>
</smil>
```

There are a header (head) element describing a content layout and an overlapping manner and a body element describing a content display method and the like below the SMIL element. A switch (swich) element is arranged below the header (head) element, and a layout element for designating a background size of the layout is arranged below that. The switch (swich) element means a selective use from a plurality of layout elements.

Here, there are layout elements respectively corresponding to a plurality of presentation device types. In this example, layout elements of Device Class 1 (DeviceClass01) and Device Class 2 (DeviceClass02) are arranged.

In the layout element of Device Class 1 (DeviceClass01), the size of the parent presentation element (region) indicated as "region id="View1"" is designated as "width="1920 px" height="1080 px"". In the layout element, the size and position of the child presentation element (region) included in View 1 (View1) are designated.

In this case, the size and position of the child presentation element (region) indicated by "region id="Area1"" are designated as "top="0%" left="0%" width="70%" height="100%"". Here, "top="0%" left="0%"" expresses the upper left position as an offset value with the upper left of the parent presentation element (region) being a base point. Moreover, the size and position of the child presentation element (region) indicated by "region id="Area1"" are designated as "top="0%" left="70%" width="30%" height="100%"".

In the layout element of Device Class 2 (DeviceClass02), the size of the parent presentation element (region) indicated as "region id="View2"" is designated as "width="1024 px" height="768 px"". In the layout element, the size and position of the child presentation element (region) included in View 2 (View2) are designated. In this case, the size and position of the child presentation element (region) indicated by "region id="Area3"" are designated as "top="0%" left="0%" width="100%" height="100%"". Here, "top="0%" left="0%"" expresses the upper left position as an offset value with the upper left of the parent presentation element (region) being a base point.

Furthermore, in the body element, a presentation (display) content of each area and the like are designated. "<ref xlink:type="locator" xlink:href="http://a.com/mpd-5.mpd#repId-1" region="Area1" begin="0"/>—Video1" indicates that Video 1 (Video1) is to be displayed in Area 1 (Area1), video data therefor is to be acquired by referencing the Representation element (repId-1) of the extended MPD file (mpd-5.mpd), and the reproduction is to be started from the beginning.

Moreover, "<ref xlink:type="locator" xlink:href="http://a.com/mpd-5.mpd#repId-2" region="Area2" begin="0"/>—Video2"" indicates that Video 2 (Video2) is to be displayed in Area 2 (Area2), video data therefor is to be acquired by referencing the Representation element (repId-2) of the extended MPD file (mpd-5.mpd), and the reproduction is to be started from the beginning.

Moreover, "<ref xlink:type="locator" xlink:href="http://a.com/mpd-5.mpd#repId-3" region="Area3" begin="0"/>—Video3"" indicates that Video 3 (Video3) is to be displayed in Area 3 (Area3), video data therefor is to be acquired by referencing the Representation element (repId-3) of the extended MPD file (mpd-5.mpd), and the reproduction is to be started from the beginning.

Figure 17:
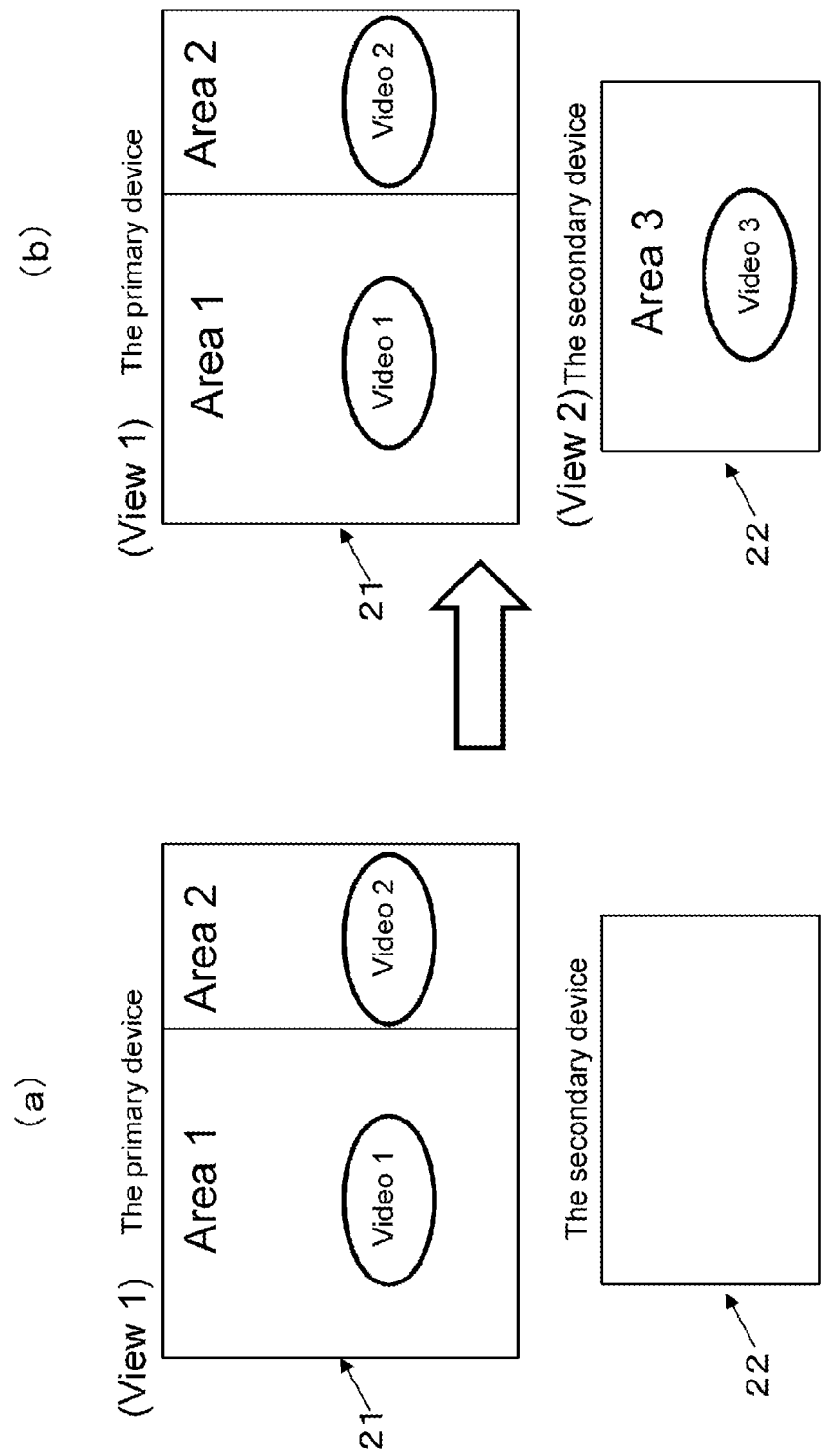
FIG. 17. Diagrams showing a display example of the presentation device for explaining a use case 5.

Here, a case where there are the primary device (The primary device) 21 and the secondary device (The secondary device) 22 as the IPTV clients 13 as shown in FIG. 17 will be discussed. The primary device 21 is a presentation device corresponding to Device Class 1 (DeviceClass01), such as a television receiver. The secondary device 22 is a presentation device corresponding to Device Class 2 (DeviceClass02), such as a tablet.

FIG. 17(a) shows a state where the power of the primary device 21 is on and the power of the secondary device 22 is off. In this state, only the primary device 21 acquires an extended MPD file (mpd-5.mpd) from the DASH MPD server 12 and acquires an extended SMIL file (smil-5.smil) from the presentation control information generation server 15 (or DASH MPD server 12) based on the extended SMIL file reference attribute in the extended MPD file.

Since the primary device 21 is a presentation device corresponding to Device Class 1 (DeviceClass01), display corresponding to the layout element of Device Class 1 included in the extended SMIL file (smil-5.smil) is performed. Specifically, Video 1 is displayed in Area 1, and Video 2 is displayed in Area 2.

FIG. 17(b) shows a state where the power of the secondary device 22 is also turned on. In this state, regarding the primary device 21, the same display state as that shown in FIG. 17(a) is maintained. The secondary device 22 acquires an extended MPD file (mpd-5.mpd) from the DASH MPD server 12 and acquires an extended SMIL file (smil-5.smil) from the presentation control information generation server 15 (or DASH MPD server 12) based on the extended SMIL file reference attribute in the extended MPD file.

Since the secondary device 22 is a presentation device corresponding to Device Class 2 (DeviceClass02), display corresponding to the layout element of Device Class 2 included in the extended SMIL file (smil-5.smil) is performed. Specifically, Video 3 is displayed in Area 3.

It should be noted that the state shown in FIG. 17(a) is changed to the state shown in FIG. 17(b) as the power of the secondary device 22 is turned on. However, the change may be made according to an occurrence of other events. For example, in the secondary device 22 that is powered on, the change may be made when a positive response operation is made by a user in response to an inquiry on whether to display Area 3. Moreover, the change may be made when reaching a predetermined preset time, for example.

In the case of the use case 5, simultaneous with the transition to the multi-screen presentation, a partial content drawing area not displayed on the primary screen can be moved to the secondary screen.

"Use Case 6 (Multi-Screen Presentation? Asset Level Sharing)"

In a use case 6, an extended SMIL-reference extended MPD file (mpd-6.mpd) as follows is acquired from the DASH MPD server 12.

```
<MPD ...smilRef="http://a.com/smil-6.smil" >
  <BaseURL>http://example.com/</BaseURL>
  <Period ...>
    <AdaptationSet ...> -- Video1
      <Representation id="repId-v1" ...>
        <BaseURL>video1.mp4</BaseURL>
        ......
    </AdaptationSet>
    <AdaptationSet ...> -- Video2
      <Representation id="repId-v2" ...>
        <BaseURL>video2.mp4</BaseURL>
        ......
    </AdaptationSet>
    <AdaptationSet ...> -- Audio1
      <Representation id="repId-a1" ...>
        <BaseURL>audio1.mp4</BaseURL>
        ......
    </AdaptationSet>
    <AdaptationSet ...> -- Audio2
      <Representation id="repId-a2" ...>
        <BaseURL>audio2.mp4</BaseURL>
        ......
    </AdaptationSet>
  </Period>
</MPD>
```

In the extended MPD file, an extended SMIL file reference attribute "smilRef="http://a.com/smil-6.smil" is arranged in the MPD element. In the use case 4, an extended SMIL file (smil-6.smil) of the following content is acquired from the presentation control information generation server 15 (or DASH MPD server 12) based on the extended SMIL file reference attribute.

```
<smil>
 <head>
  <switch>
   <layout system-device-class="DeviceClass01">
    <region id=" View1" width=" 1920px" height=" 1080px" >
     <region id=" Area1" top=" 0%" left=" 0%" width=" 70%" height=" 100%" >
     <region id=" Area2" top=" 0%" left=" 70%" width=" 30%" height=" 100%" >
    </region>
    <region id=" View3" width=" 1920px" height=" 1080px" >
     <region id=" Area1" top=" 0%" left=" 0%" width=" 70%" height=" 100%" >
     <region id=" Area3" top=" 0%" left=" 70%" width=" 30%" height=" 100%" >
    </region>
   </layout>
   <layout system-device-class="DeviceClass02">
    <region id="View2" width="1024px" height="768px" coexistWith="View3">
     <region id=" Area4" top=" 0%" left=" 0%" width=" 100%" height=" 100%" >
    </region>
   </layout>
  </switch>
 </head>
 <body>
  <par xmlns:xlink=" http://www.w3.org/1999/xlink" >
   <ref xlink:type="locator"
    xlink:href="http://a.com/mpd-6.mpd#repId-v1"
    region="Area1" begin="0"/> -- Video1
   <ref xlink:type="locator"
    xlink:href="http://a.com/mpd-6.mpd#repId-a1"
    region="Area1" begin="0"/> -- Audio1
   <ref xlink:type="locator"
    xlink:href="http://a.com/mpd-6.mpd#repId-v2"
    region="Area2" begin=" 0" /> -- Video2
   <ref xlink:type="locator"
    xlink:href="http://a.com/mpd-6.mpd#repId-a2"
    region="Area2" begin="0"/> -- Audio2
   <ref xlink:type="locator"
    xlink:href="http://a.com/mpd-6.mpd#repId-v2"
    region="Area4" begin="0"/> -- Video2
   <ref xlink:type="locator"
    xlink:href="http://a.com/mpd-6.mpd#repId-a2"
    region="Area3" begin="0"/> -- Audio2
  </par>
 </body>
</smil>
```

A switch (swich) element is arranged below the header (head) element, and a layout element for designating a background size of the layout is arranged below that. The switch (swich) element means a selective use from a plurality of layout elements.

Here, there are layout elements respectively corresponding to a plurality of presentation device types. In this example, layout elements of Device Class 1 (DeviceClass01) and Device Class 2 (DeviceClass02) are arranged.

In the layout element of Device Class 1 (DeviceClass01), the size of the parent presentation element (region) indicated as "region id="View1"" is designated as "width="1920 px" height="1080 px"". In the layout element, the size and position of the child presentation element (region) included in View 1 (View1) are designated.

In this case, the size and position of the child presentation element (region) indicated by "region id="Area1"" are designated as "top="0%" left="0%" width="70%" height="100%"". Here, "top="0%" left="0%"" expresses the upper left position as an offset value with the upper left of the parent presentation element (region) being a base point. Moreover, the size and position of the child presentation element (region) indicated by "region id="Area1"" are designated as "top="0%" left="70%" width="30%" height="100%"".

In the layout element of Device Class 1 (DeviceClass01), the size of the parent presentation element (region) indicated as "region id="View3"" is designated as "width="1920 px" height="1080 px"". In the layout element, the size and position of the child presentation element (region) included in View 3 (View3) are designated. In this case, the size and position of the child presentation element (region) indicated by "region id="Area1"" are designated as "top="0%" left="0%" width="70%" height="100%"". Moreover, the size and position of the child presentation element (region) indicated by "region id="Area3"" are designated as "top="0%" left="70%" width="30%" height="100%"".

In the layout element of Device Class 2 (DeviceClass02), the size of the parent presentation element (region) indicated as "region id="View2"" is designated as "width="1024 px" height="768 px"". Here, "coexistWith" is an attribute indicating an inter-View synchronization relationship (restriction). The description of "coexistWith="View3"" regarding View 2 (View2) indicates that View 2 (View2) and View 3 (View3) described above coexist. In other words, when using View 2 (View2), View 3 (View3) always needs to be used.

In the layout element, the size and position of the child presentation element (region) included in View 2 (View2) are designated. In this case, the size and position of the child presentation element (region) indicated by "region id="Area4"" are designated as "top="0%" left="0%" width="100%" height="100%"". Here, "top="0%" left="0%"" expresses the upper left position as an offset value with the upper left of the parent presentation element (region) being a base point.

Furthermore, in the body element, a presentation (display) content of each area and the like are designated. "<ref xlink:type="locator" xlink:href="http://a.com/mpd-6.mpd#repId-v1" region="Area1" begin="0"/>—Video1" indicates that Video 1 (Video1) is to be displayed in Area 1 (Area1), video data therefor is to be acquired by referencing the Representation element (repId-v1) of the extended MPD file (mpd-6.mpd), and the reproduction is to be started from the beginning.

Moreover, "<ref xlink:type="locator" xlink:href="http://a.com/mpd-6.mpd#repId-a1" region="Area1" begin="0"/>—Audio1" indicates that Audio 1 (Audio1) is to be displayed in Area 1 (Area1), audio data therefor is to be acquired by referencing the Representation element (repId-a1) of the extended MPD file (mpd-6.mpd), and the reproduction is to be started from the beginning.

Moreover, "<ref xlink:type="locator" xlink:href="http://a.com/mpd-6.mpd#repId-v2" region="Area2" begin="0"/>—Video2"" indicates that Video 2 (Video2) is to be displayed in Area 2 (Area2), video data therefor is to be acquired by referencing the Representation element (repId-v2) of the extended MPD file (mpd-6.mpd), and the reproduction is to be started from the beginning.

Moreover, "<ref xlink:type="locator" xlink:href="http://a.com/mpd-6.mpd#repId-a2" region="Area2" begin="0"/>—Audio2" indicates that Audio 2 (Audio2) is to be displayed in Area 2 (Area2), audio data therefor is to be acquired by referencing the Representation element (repId-a2) of the extended MPD file (mpd-6.mpd), and the reproduction is to be started from the beginning.

Moreover, "<ref xlink:type="locator" xlink:href="http://a.com/mpd-6.mpd#repId-v2" region="Area4" begin="0"/>—Video2"" indicates that Video 2 (Video2) is to be displayed in Area 4 (Area4), video data therefor is to be acquired by referencing the Representation element (repId-v2) of the extended MPD file (mpd-6.mpd), and the reproduction is to be started from the beginning.

Moreover, "<ref xlink:type="locator" xlink:href="http://a.com/mpd-6.mpd#repId-a2" region="Area3" begin="0"/>—Audio2" indicates that Audio 2 (Audio2) is to be displayed in Area 3 (Area3), audio data therefor is to be acquired by referencing the Representation element (repId-a2) of the extended MPD file (mpd-6.mpd), and the reproduction is to be started from the beginning.

Figure 18:
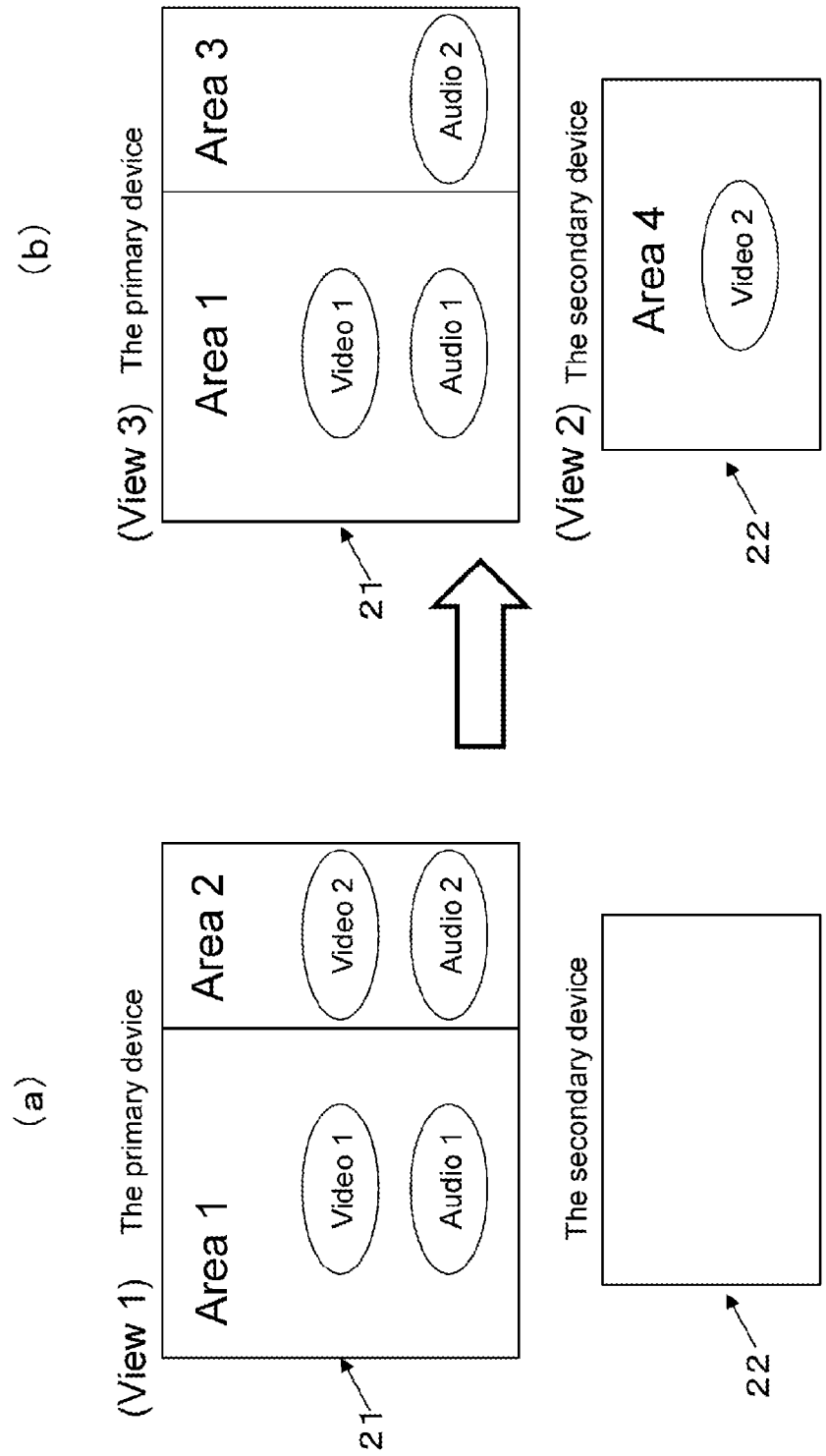
FIG. 18. Diagrams showing a display example of the presentation device for explaining a use case 6.

Here, a case where there are the primary device (The primary device) 21 and the secondary device (The secondary device) 22 as the IPTV clients 13 as shown in FIG. 18 will be discussed. The primary device 21 is a presentation device corresponding to Device Class 1 (DeviceClass01), such as a television receiver. The secondary device 22 is a presentation device corresponding to Device Class 2 (DeviceClass02), such as a tablet.

FIG. 18(*a*) shows a state where the power of the primary device 21 is on and the power of the secondary device 22 is off. In this state, only the primary device 21 acquires an extended MPD file (mpd-6.mpd) from the DASH MPD server 12 and acquires an extended SMIL file (smil-6.smil) from the presentation control information generation server 15 (or DASH MPD server 12) based on the extended SMIL file reference attribute in the extended MPD file.

Since the primary device 21 is a presentation device corresponding to Device Class 1 (DeviceClass01), display corresponding to the layout element of Device Class 1 included in the extended SMIL file (smil-6.smil) is performed. Specifically, Video 1 and Audio 1 are displayed in Area 1, and Video 2 and Audio 2 are displayed in Area 2.

FIG. 18(*b*) shows a state where the power of the secondary device 22 is also turned on. In this state, regarding the primary device 21, the state of displaying View 1 (View1) is changed to the state of displaying View 3 (View3). In this case, Video 1 is continuously displayed in Area 1, but Area 2 changes to Area 3 and only Audio 2 is displayed. In other words, Video 2 is not displayed. The display change of the primary device 21 is performed automatically by an inter-device communication in sync with the display start of Video 2 in Area 4 in the secondary device 22 to be described later, for example.

The secondary device 22 acquires an extended MPD file (mpd-6.mpd) from the DASH MPD server 12 and acquires an extended SMIL file (smil-6.smil) from the presentation control information generation server 15 (or DASH MPD server 12) based on the extended SMIL file reference attribute in the extended MPD file.

Since the secondary device 22 is a presentation device corresponding to Device Class 2 (DeviceClass02), display corresponding to the layout element of Device Class 2 included in the extended SMIL file (smil-6.smil) is performed. Specifically, Video 2 is displayed in Area 4.

It should be noted that in the descriptions above, the state shown in FIG. 18(*a*) is changed to the state shown in FIG. 18(*b*) as the power of the secondary device 22 is turned on. However, the change may be made according to an occurrence of other events. For example, in the secondary device 22 that is powered on, the change may be made when a positive response operation is made by a user in response to an inquiry on whether to display Area 2. Moreover, the change may be made when reaching a predetermined preset time, for example.

In the case of the use case 6, simultaneous with the transition to the multi-screen presentation, a partial content in a partial drawing area of the primary screen can be moved to the secondary screen.

"Use Case 7 (Asset Receiving in Multi-Screen Presentation)"

In a use case 7, an extended SMIL-reference extended MPD file (mpd-7.mpd) as follows is acquired from the DASH MPD server 12.

```
<MPD ...smilRef="http://a.com/smil-7.smil" >
  <BaseURL>http://example.com/</BaseURL>
  <Period ...>
    <AdaptationSet ...> -- Video1
     <Representation id="repId-v1" ...>
      <BaseURL>video1.mp4</BaseURL>
     ......
    </AdaptationSet>
    <AdaptationSet ...> -- Video2
     <Representation id="repId-v2" ...>
      <BaseURL>video2.mp4</BaseURL>
     ......
    </AdaptationSet>
  </Period>
</MPD>
```

In the extended MPD file, an extended SMIL file reference attribute "smilRef="http://a.com/smil-7.smil" is arranged in the MPD element. In the use case 7, an extended SMIL file (smil-7.smil) of the following content is acquired from the presentation control information generation server 15 (or DASH MPD server 12) based on the extended SMIL file reference attribute.

```
<smil>
 <head>
  <switch>
   <layout system-device-class="DeviceClass01">
    <region id=" View1" width=" 1920px"
height=" 1080px" >
     <region id=" Area1" top=" 0%" left=" 0%"
width=" 100%" height=" 100%" >
     </region>
    <region id=" View3" width=" 1920px"
height=" 1080px" >
     <region id=" Area1" top=" 0%" left=" 0%"
width=" 70%" height=" 100%" >
     <region id=" Area2" top=" 0%" left=" 0%"
width=" 30%" height=" 100%" >
    </region>
   </layout>
   <layout system-device-class="DeviceClass02">
    <region id="View2" width="1024px" height=" 768px"
coexistWith=" View1" >
     <region id=" Area3" top=" 0%" left=" 0%"
width=" 100%" height=" 100%" >
    </region>
   </layout>
  </switch>
 </head>
 <body>
  <par xmlns:xlink=" http://www.w3.org/1999/xlink" >
   <ref xlink:type="locator"
xlink:href="http://a.com/mpd-7.mpd#repId-v1"
region="Area1" begin="0"/> -- Video1
   <ref xlink:type="locator"
xlink:href="http://a.com/mpd-7.mpd#repId-v2"
region="Area2" begin="0"/> -- Video2
   <ref xlink:type="locator"
xlink:href="http://a.com/mpd-7.mpd#repId-v2"
region="Area3" begin=" 0" /> -- Video2
  </par>
 </body>
</smil>
```

There are a header (head) element describing a content layout and an overlapping manner and a body element describing a content display method and the like below the SMIL element. A switch (swich) element is arranged below the header (head) element, and a layout element for designating a background size of the layout is arranged below that. The switch (swich) element means a selective use from a plurality of layout elements.

Here, there are layout elements respectively corresponding to a plurality of presentation device types. In this example, layout elements of Device Class 1 (DeviceClass01) and Device Class 2 (DeviceClass02) are arranged.

In the layout element of Device Class 1 (DeviceClass01), the size of the parent presentation element (region) indicated as "region id="View1"" is designated as "width="1920 px" height="1080 px"". In the layout element, the size and position of the child presentation element (region) included in View 1 (View1) are designated.

In this case, the size and position of the child presentation element (region) indicated by "region id="Area1"" are designated as "top="0%" left="0%" width="100%" height="100%"". Here, "top="0%" left="0%"" expresses the upper left position as an offset value with the upper left of the parent presentation element (region) being a base point.

Further, in the layout element of Device Class 1 (DeviceClass01), the size of the parent presentation element (region) indicated as "region id="View3"" is designated as "width="1920 px" height="1080 px"". In the layout element, the size and position of the child presentation element (region) included in View 3 (View3) are designated.

In this case, the size and position of the child presentation element (region) indicated by "region id="Area1"" are designated as "top="0%" left="0%" width="70%" height="100%"". Moreover, the size and position of the child presentation element (region) indicated by "region id="Area2"" are designated as "top="0%" left="70%" width="30%" height="100%"".

Further, in the layout element of Device Class 2 (DeviceClass02), the size of the parent presentation element (region) indicated as "region id="View2"" is designated as "width="1024 px" height="768 px"". Here, "coexistWith" is an attribute indicating an inter-View synchronization relationship (restriction). The description of "coexistWith="View1"" regarding View 2 (View2) indicates that View 2 (View2) and View 1 (View1) described above coexist. In other words, when using View 2 (View2), View 1 (View1) always needs to be used.

In the layout element, the size and position of the child presentation element (region) included in View 2 (View2) are designated. In this case, the size and position of the child presentation element (region) indicated by "region id="Area3"" are designated as "top="0%" left="0%" width="100%" height="100%"". Here, "top="0%" left="0%"" expresses the upper left position as an offset value with the upper left of the parent presentation element (region) being a base point.

Furthermore, in the body element, a presentation (display) content of each area and the like are designated. "<ref xlink:type="locator" xlink:href="http://a.com/mpd-7.mpd#repId-v1" region="Area1" begin="0"/>—Video1" indicates that Video 1 (Video1) is to be displayed in Area 1 (Area1), video data therefor is to be acquired by referencing the Representation element (repId-v1) of the extended MPD file (mpd-7.mpd), and the reproduction is to be started from the beginning.

Moreover, "<ref xlink:type="locator" xlink:href="http://a.com/mpd-7.mpd#repId-v2" region="Area2" begin="0"/>—Video2" indicates that Video 2 (Video2) is to be displayed in Area 2 (Area2), video data therefor is to be acquired by referencing the Representation element (repId-v2) of the extended MPD file (mpd-7.mpd), and the reproduction is to be started from the beginning.

Moreover, "<ref xlink:type="locator" xlink:href="http://a.com/mpd-7.mpd#repId-v2" region="Area3" begin="0"/>—Video2" indicates that Video 2 (Video2) is to be displayed in Area 3 (Area3), video data therefor is to be acquired by referencing the Representation element (repId-v2) of the extended MPD file (mpd-7.mpd), and the reproduction is to be started from the beginning.

Figure 19:
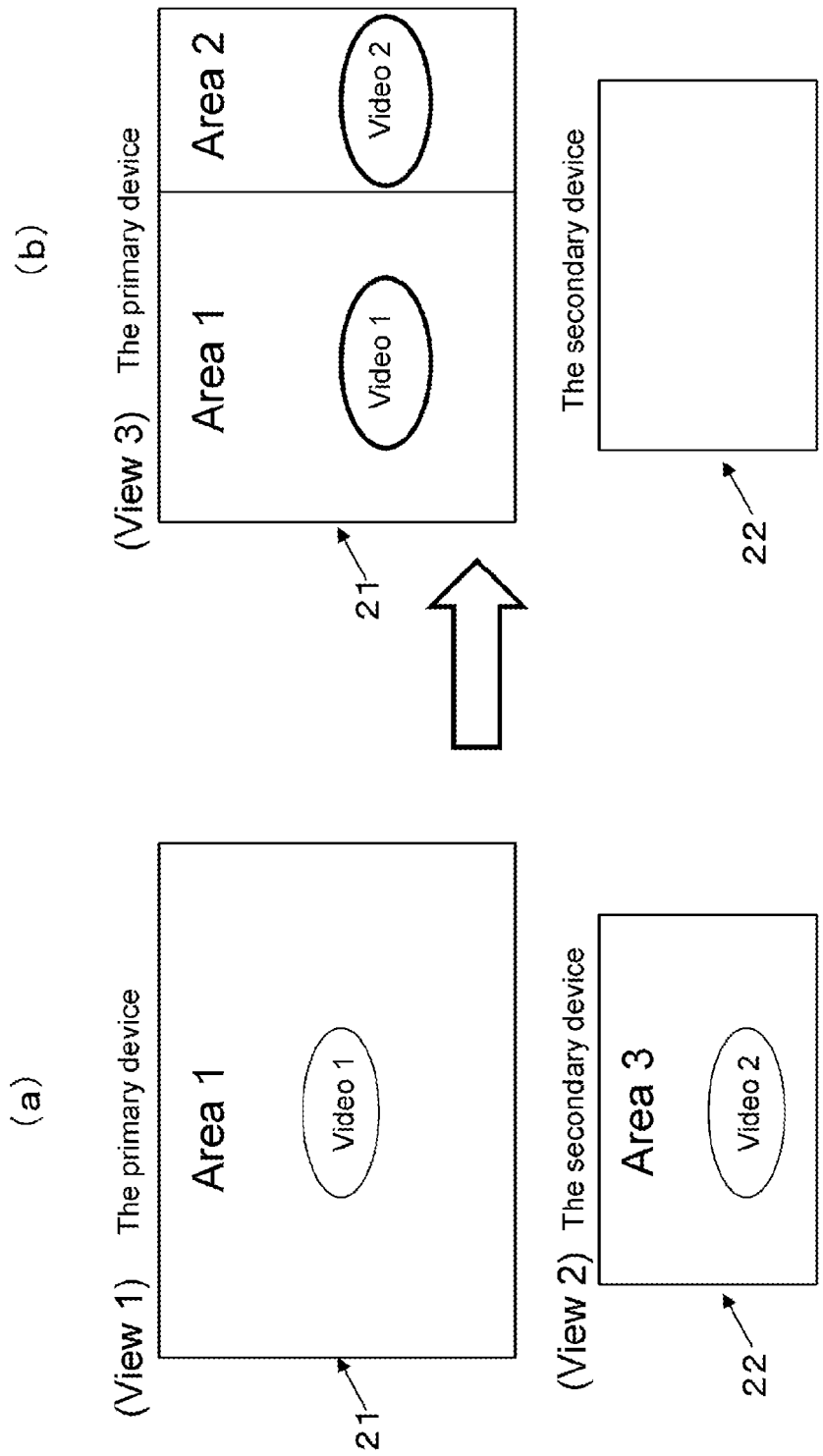
FIG. 19. Diagrams showing a display example of the presentation device for explaining a use case 7.

Here, a case where there are the primary device (The primary device) 21 and the secondary device (The secondary device) 22 as the IPTV clients 13 as shown in FIG. 19 will be discussed. The primary device 21 is a presentation device corresponding to Device Class 1 (DeviceClass01), such as a television receiver. The secondary device 22 is a presentation device corresponding to Device Class 2 (DeviceClass02), such as a tablet.

FIG. 19(a) shows a state where the power of both the primary device 21 and the secondary device 22 is on. In this state, for example, both the primary device 21 and the secondary device 22 acquire an extended MPD file (mpd-7.mpd) and acquire an extended SMIL file (smil-7.smil) based on the extended SMIL file reference attribute in the extended MPD file. In this case, the extended MPD file (mpd-7.mpd) is acquired from the DASH MPD server 12, and the extended SMIL file (smil-7.smil) is acquired from the presentation control information generation server 15 (or DASH MPD server 12).

Since the primary device 21 is a presentation device corresponding to Device Class 1 (DeviceClass01), display of View 1 (View1) is performed based on the layout element of Device Class 1 included in the extended SMIL file (smil-7.smil). Specifically, Video 1 is displayed in Area 1.

On the other hand, since the secondary device 22 is a presentation device corresponding to Device Class 2 (DeviceClass02), display of View 2 (View2) is performed based on the layout element of Device Class 2 included in the extended SMIL file (smil-7.smil). Specifically, Video 2 is displayed in Area 3.

In this case, by an attribute value of "coexistWith="View1"" arranged in relation to View 2 (View2) included in (smil-7.smil), an inter-device communication is performed so as to continue display of View 1 (View1) in the primary device 21 while View 2 (View2) is displayed in the secondary device 22, for example.

FIG. 19(*b*) shows a state where the power of the secondary device 22 is off. In this state, regarding the primary device 21, the state of displaying View 1 (View1) is changed to the state of displaying View 3 (View3). Specifically, Video 1 is displayed in Area 1, and Video 2 is displayed in Area 2. In this case, since View 2 (View2) is not displayed in the secondary device 22, the primary device 21 is not restricted regarding display.

It should be noted that in the descriptions above, the state shown in FIG. 19(*a*) is changed to the state shown in FIG. 19(*b*) as the power of the secondary device 22 is turned off. However, the change may be made according to an occurrence of other events. For example, in the secondary device 22 that is powered on, the change may be made when a positive response operation is made by a user in response to an inquiry on whether to not display Area 3. Moreover, the change may be made when reaching a predetermined preset time, for example.

In the use case 7, a partial drawing area of the secondary screen can be moved to the primary screen simultaneous with the cancel of the multi-screen presentation.

[Operational Example of Stream Delivery System]

Figure 20:
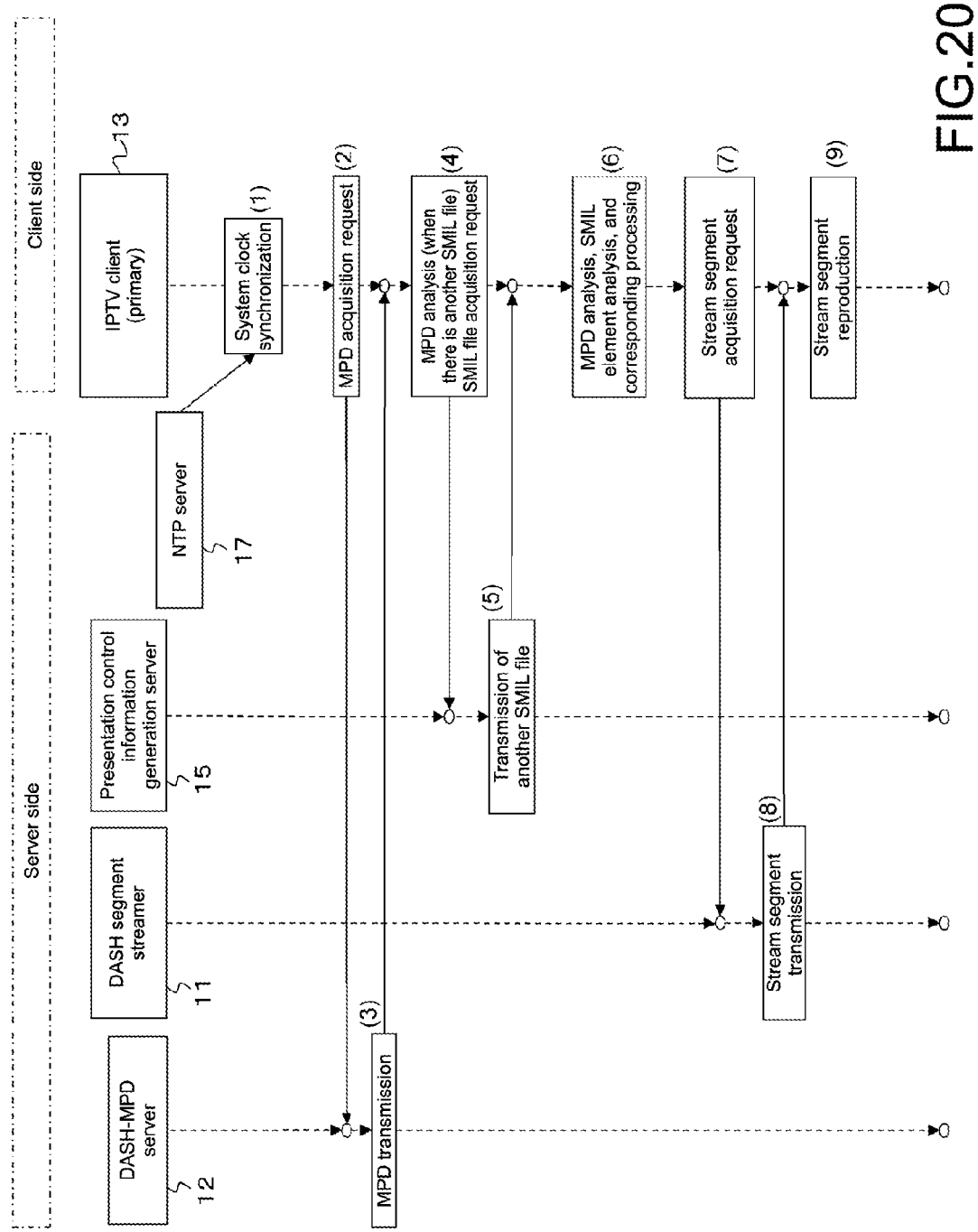
FIG. 20. A diagram schematically showing an example of a flow from an MPD request from the IPTV client up to content (DASH stream segment) reproduction.

FIG. 20 schematically shows an example of a flow from an MPD request from the IPTV client 13 up to content (DASH stream segment) reproduction.

(1) The IPTV client 13 synchronizes a system clock based on time information supplied from the NTP server 17. (2) The IPTV client 13 transmits an MPD file acquisition request related to a predetermined content to the DASH MPD server 12. (3) In response to the acquisition request, the DASH MPD server 12 transmits an MPD file to the IPTV client 13.

(4) The IPTV client 13 analyzes the received MPD file and when there is another SMIL file, transmits a SMIL file acquisition request to the presentation control information generation server 15. (5) In response to the acquisition request, the presentation control information generation server 15 transmits the SMIL file to the IPTV client 13.

(6) The IPTV client 13 carries out an analysis of the MPD file, an analysis of the SMIL element, and corresponding processing (layout processing, image and widget data acquisition/reproduction processing, etc.). (7) The IPTV client 13 also transmits a stream segment acquisition request to the DASH segment streamer 11 for acquiring requisite video and audio data.

(8) In response to the acquisition request, the DASH segment streamer 11 transmits a stream segment to the IPTV client 13. (9) The IPTV client 13 that has received the stream segment carries out decoding processing on the stream segment and reproduces a moving image or audio of the predetermined content.

It should be noted that the flow of FIG. 20 shows the example where the SMIL file is acquired from the presentation control information generation server 15. However, when the DASH MPD server 12 stores the SMIL file, the SMIL file is acquired from the DASH MPD server 12.

Figure 21:
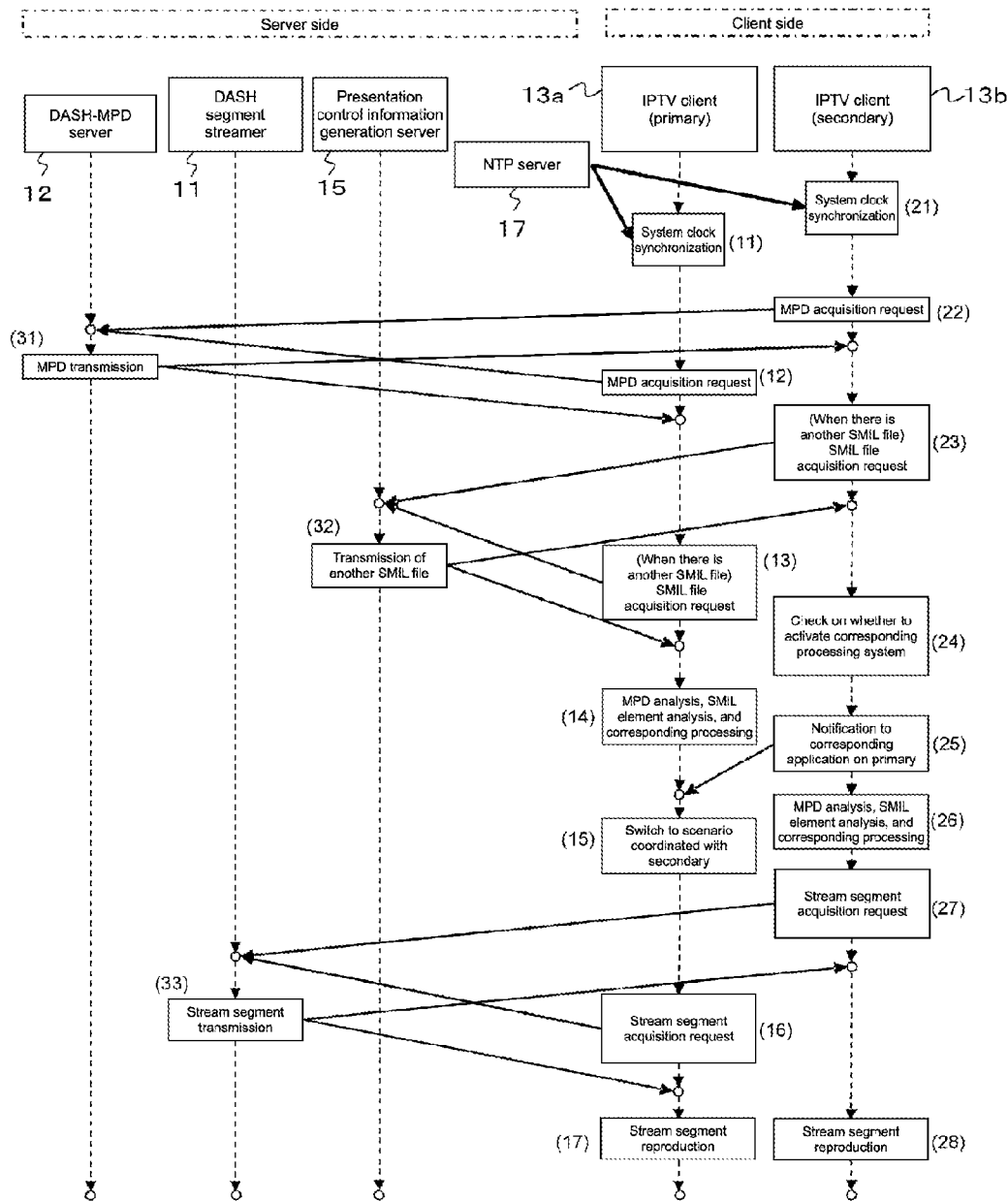
FIG. 21. A diagram schematically showing an example of a flow from an MPD request from primary and secondary IPTV clients to the content (DASH stream segment) reproduction.

FIG. 21 schematically shows an example of a flow from an MPD request from primary and secondary IPTV clients 13*a* and 13*b* to the content (DASH stream segment) reproduction.

First the IPTV client (primary) 13*a* side will be described. (11) The IPTV client 13*a* synchronizes the system clock based on the time information supplied from the NTP server 17. (12) The IPTV client 13*a* transmits an MPD file acquisition request related to a predetermined content to the DASH MPD server 12. (31) In response to the acquisition request, the DASH MPD server 12 transmits an MPD file to the IPTV client 13*a*.

(13) The IPTV client 13*a* analyzes the received MPD file and when there is another SMIL file, transmits a SMIL file acquisition request to the presentation control information generation server 15. (32) In response to the acquisition request, the presentation control information generation server 15 transmits the SMIL file to the IPTV client 13*a*.

(14) The IPTV client 13*a* carries out an analysis of the MPD file, an analysis of the SMIL element, and corresponding processing (layout processing, image and widget data acquisition/reproduction processing, etc.). (15) Then, when there is a notification from the IPTV client (secondary) 13*b*, the IPTV client 13*a* switches to a scenario (layout, display form) coordinated with the IPTV client 13*b*.

(16) The IPTV client 13 transmits a stream segment acquisition request to the DASH segment streamer 11 for acquiring requisite video and audio data. (33) In response to the acquisition request, the DASH segment streamer 11 transmits a stream segment to the IPTV client 13*a*. (17) The IPTV client 13*a* that has received the stream segment carries out decoding processing on the stream segment and reproduces a moving image or audio of the predetermined content.

Next, the IPTV client (secondary) 13*b* side will be described. (21) The IPTV client 13*b* synchronizes the system clock based on the time information supplied from the NTP server 17. (22) The IPTV client 13*b* transmits an MPD file acquisition request related to a predetermined content to the DASH MPD server 12. (31) In response to the acquisition request, the DASH MPD server 12 transmits an MPD file to the IPTV client 13*b*.

(23) The IPTV client 13*b* analyzes the received MPD file and when there is another SMIL file, transmits a SMIL file acquisition request to the presentation control information generation server 15. (32) In response to the acquisition request, the presentation control information generation server 15 transmits the SMIL file to the IPTV client 13*b*.

(24) The IPTV client 13*b* checks whether to activate a corresponding processing system. For example, a user using the PTV clients 13*a* and 13*b* at the same time is asked to respond to an inquiry on whether to use both screens at the same time. (25) After the check, the IPTV client 13*b* notifies it to a corresponding application on the IPTV client (primary) 13*a*.

(26) The IPTV client 13b carries out an analysis of the MPD file, an analysis of the SMIL element, and corresponding processing (layout processing, image and widget data acquisition/reproduction processing, etc.). (27) Then, the IPTV client 13b transmits a stream segment acquisition request to the DASH segment streamer 11 for acquiring requisite video and audio data.

(33) In response to the acquisition request, the DASH segment streamer 11 transmits a stream segment to the IPTV client 13b. (28) The IPTV client 13b that has received the stream segment carries out decoding processing on the stream segment and reproduces a moving image or audio of the predetermined content.

It should be noted that the flow of FIG. 21 shows the example where the SMIL file is acquired from the presentation control information generation server 15. However, when the DASH MPD server 12 stores the SMIL file, the SMIL file is acquired from the DASH MPD server 12.

As described above, in the stream delivery system 10 shown in FIG. 1, the IPTV client 13 can acquire an extended SMIL-inclusive extended MPD file (see FIG. 7(a)) or extended SMIL-reference extended MPD file (see FIG. 7(b)) from the DASH MPD server 12.

Therefore, for example, content presentation layout control can be performed with ease in the IPTV client 13.

<2. Modified Example>

It should be noted that although two types are exemplified as the plurality of presentation device types in the embodiment above, the same cooperative presentation control is possible also in the case of 3 types or more. Moreover, in the above embodiment, the present technique is applied to the stream delivery system that delivers MPEG-DASH base video data streams. The present technique is of course similarly applicable to other similar video data stream delivery systems.

Furthermore, the present technique may also take the following structures.

(1) A transmission apparatus, including:
a storage section that stores a metafile including, together with acquisition information used for a client terminal to acquire a predetermined number of data streams of a content that can be delivered by a delivery server via a network, reference information for referencing a file including presentation control information for performing presentation control of the content or the presentation control information for performing presentation control of the content; and
a transmission section that transmits, to the client terminal via the network, the stored metafile in response to a transmission request transmitted from the client terminal via the network.

(2) The transmission apparatus according to (1) above,
in which the presentation control information includes reference information for referencing a predetermined control target element included in the acquisition information.

(3) The transmission apparatus according to (2) above,
in which the metafile is an extended MPD file, and
in which the control target element is an adaptation set element or a representation element.

(4) The transmission apparatus according to any one of (1) to (3) above,
in which the presentation control information includes presentation time information of a parent presentation element including a predetermined number of child presentation elements.

(5) The transmission apparatus according to any one of (1) to (4) above,
in which the presentation control information includes presentation control information corresponding to a plurality of presentation device types.

(6) The transmission apparatus according to (5) above,
in which the presentation control information includes information for designating presentation control information of a second presentation device type that may coexist with presentation control information of a first presentation device type.

(7) The transmission apparatus according to any one of (1) to (6) above,
in which the metafile is an extended MPD file, and the presentation control information is an extended SMIL element.

(8) A metafile transmission method, including the steps of:
receiving a transmission request transmitted from a client terminal via a network; and
transmitting to the client terminal via the network, upon receiving the transmission request, a metafile including, together with acquisition information used for the client terminal to acquire a predetermined number of data streams of a content that can be delivered by a delivery server via the network, reference information for referencing a file including presentation control information for performing presentation control of the content or the presentation control information for performing presentation control of the content.

(9) A reception apparatus, including:
a reception section that receives a metafile including, together with acquisition information used for a client terminal to acquire a predetermined number of data streams of a content that can be delivered by a delivery server via a network, reference information for referencing a file including presentation control information for performing presentation control of the content or the presentation control information for performing presentation control of the content; and
a processing section that carries out processing based on the received metafile.

(10) The reception apparatus according to (9) above,
in which the presentation control information includes reference information for referencing a predetermined control target element included in the acquisition information.

(11) The reception apparatus according to (10) above,
in which the metafile is an extended MPD file, and
in which the control target element is an adaptation set element or a representation element.

(12) The reception apparatus according to any one of (9) to (11) above,
in which the presentation control information includes presentation time information of a parent presentation element including a predetermined number of child presentation elements.

(13) The reception apparatus according to any one of (9) to (12) above,
in which the presentation control information includes presentation control information corresponding to a plurality of presentation device types.

(14) The reception apparatus according to (13) above,
in which the presentation control information includes information for designating presentation control information of a second presentation device type that may coexist with presentation control information of a first presentation device type.

(15) The reception apparatus according to any one of (9) to (14) above,
in which the metafile is an extended MPD file, and the presentation control information is an extended SMIL element.
(16) A reception processing method, including the steps of:
receiving a metafile including, together with acquisition information used for a client terminal to acquire a predetermined number of data streams of a content that can be delivered by a delivery server via a network, reference information for referencing a file including presentation control information for performing presentation control of the content or the presentation control information for performing presentation control of the content; and
carrying out processing based on the received metafile.
The feature of the present technique is that, in the MPEG-DASH base video data stream delivery system, for example, the content presentation layout control can be performed with each in the IPTV client by using the extended SMIL-inclusive extended MPD file or extended SMIL-reference extended MPD file (see FIG. 7).

DESCRIPTION OF SYMBOLS 10 stream delivery system
11 DASH segment streamer
12 DASH MPD server
13, 13-1-13-3, 13a, 13b IPTV client
14 CDN
15 presentation control information generation server
16 content management sever
17 NTP server
21 primary device
22 secondary device
131 streaming data controller
132 HTTP access section
133 moving image reproduction section

The invention claimed is:

1. A transmission apparatus, comprising:
processing circuitry configured to
store, in a memory, first acquisition information used for a first client terminal to acquire a first determined number of data streams of first content that are to be delivered by a delivery server via a network, second acquisition information used for the first client terminal and a second client terminal to acquire a second determined number of data streams of a second content that are to be delivered by the delivery server via the network, a first metafile, and a second metafile,
wherein the first metafile includes either first presentation control information to control presentation of the first content or first reference information to refer a first file that includes the first presentation control information, and the second metafile includes either second presentation control information to control presentation of the second content or second reference information to refer a second file that includes the second presentation control information,
wherein the first presentation control information includes first presentation time information that designates a start time at which the first content is to be reproduced, and the second presentation control information includes second presentation time information that designates a start time at which the second content is to be reproduced;
transmit, to the first client terminal via the network, the stored first metafile and the stored second metafile based on a first transmission request transmitted from the first client terminal via the network; and
transmit, to the second client terminal via the network, the stored second metafile based on a second transmission request transmitted from the second client terminal via the network, wherein
the first client terminal stops reproducing the second content in response to receiving a notification from the second client terminal.

2. The transmission apparatus according to claim 1, wherein the first presentation control information includes reference information to reference a determined control target element included in the first acquisition information.

3. The transmission apparatus according to claim 2, wherein the first metafile is an extended media presentation description (MPD) file, and
wherein the determined control target element is an adaptation set element or a representation element.

4. The transmission apparatus according to claim 1, wherein the first presentation control information includes the first presentation time information of a parent presentation element that includes a number of child presentation elements.

5. The transmission apparatus according to claim 1, wherein the first presentation control information includes presentation control information that corresponds to a plurality of presentation device types.

6. The transmission apparatus according to claim 1, wherein the first metafile is an extended media presentation description (MPD) file, and the first presentation control information is an extended synchronized multimedia integration language (SMIL) element.

7. A metafile transmission method, comprising:
storing, in a memory, first acquisition information used for a first client terminal to acquire a first determined number of data streams of first content that are to be delivered by a delivery server via a network, second acquisition information used for the first client terminal and a second client terminal to acquire a second determined number of data streams of a second content that are to be delivered by the delivery server via the network, a first metafile, and a second metafile,
wherein the first metafile includes either first presentation control information to control presentation of the first content or first reference information to refer a first file that includes the first presentation control information, and the second metafile includes either second presentation control information to control presentation of the second content or second reference information to refer a second file that includes the second presentation control information,
wherein the first presentation control information includes first presentation time information that designates a start time at which the first content is to be reproduced, and the second presentation control information includes second presentation time information that designates a start time at which the second content is to be reproduced;
transmitting, to the first client terminal via the network, the stored first metafile and the stored second metafile based on a first transmission request transmitted from the first client terminal via the network; and
transmitting, to the second client terminal via the network, the stored second metafile based on a second transmission request transmitted from the second client terminal via the network, wherein
the first client terminal stops reproducing the second content in response to receiving a notification from the second client terminal.

8. A reception apparatus, comprising:
processing circuitry configured to
receive, from the transmission apparatus, a first metafile including first acquisition information and a second acquisition information,
wherein the first acquisition information is used for the reception apparatus to acquire a first determined number of data streams of first content that are to be delivered by a delivery server via the network, and second acquisition information is used for the reception apparatus and another reception apparatus to acquire a second determined number of data streams of a second content that are to be delivered by the delivery server via the network,
wherein the first metafile includes either first presentation control information to control presentation of the first content or first reference information to refer a first file that includes the first presentation control information, and includes either second presentation control information to control presentation of the second content or second reference information to refer a second file that includes the second presentation control information,
wherein the first presentation control information includes first presentation time information that designates a start time at which the first content is to be reproduced, and the second presentation control information includes second presentation time information that designates a start time at which the second content is to be reproduced;
process reproduction of the first content and reproduction of the second content based on the received first metafile;
receive a notification from the another reception apparatus; and
stop reproducing at least one of the data streams of the second content in response to receiving the notification from the another reception apparatus.

9. The reception apparatus according to claim 8,
wherein the first presentation control information includes reference information to reference a determined control target element included in the first acquisition information.

10. The reception apparatus according to claim 9,
wherein the first metafile is an extended media presentation description (MPD) file, and wherein the determined control target element is an adaptation set element or a representation element.

11. The reception apparatus according to claim 8,
wherein the first presentation control information includes the first presentation time information of a parent presentation element that includes a number of child presentation elements.

12. The reception apparatus according to claim 8, wherein the first presentation control information includes presentation control information that corresponds to a plurality of presentation device types.

13. The reception apparatus according to claim 8,
wherein the first metafile is an extended media presentation description (MPD) file, and the first presentation control information is an extended synchronized multimedia integration language (SMIL) element.

14. A reception processing method by a reception apparatus, comprising:
receiving, from the transmission apparatus, a first metafile including first acquisition information and a second acquisition information,
wherein the first acquisition information is used for the reception apparatus to acquire a first determined number of data streams of first content that are to be delivered by a delivery server via the network, and second acquisition information is used for the reception apparatus and another reception apparatus to acquire a second determined number of data streams of a second content that are to be delivered by the delivery server via the network,
wherein the first metafile includes either first presentation control information to control presentation of the first content or first reference information to refer a first file that includes the first presentation control information, and includes either second presentation control information to control presentation of the second content or second reference information to refer a second file that includes the second presentation control information,
wherein the first presentation control information includes first presentation time information that designates a start time at which the first content is to be reproduced, and the second presentation control information includes second presentation time information that designates a start time at which the second content is to be reproduced;
processing, using processing circuitry, reproduction of the first content and reproduction of the second content based on the received first metafile;
receiving a notification from the another reception apparatus; and
stopping reproducing at least one of the data streams of the second content in response to receiving the notification from the another reception apparatus.

15. The reception apparatus according to claim 8,
wherein the processing circuitry is further configured to acquire the first presentation control information based on the first reference information and process reproduction of the first content based on the first presentation control information.

16. The reception apparatus according to claim 8, wherein
the data streams of the second content include video and audio data streams,
before receiving the notification, the processing circuitry is configured to process reproduction of the video and audio streams of the second content based on the received first metafile, and
after receiving the notification, the processing circuitry is configured to stop reproducing the video data stream of the second content and continue reproducing the audio data stream of the second content.

17. The reception apparatus according to claim 16,
wherein the second presentation control information indicates that the reproduction of the audio data stream of the second content and the reproduction of the video data stream of the second content are synchronized.

18. The reception processing method according to claim 14, wherein
the data streams of the second content include video and audio data streams, and
the method further comprising:
before receiving the notification, processing reproduction of the video and audio streams of the second content based on the received first metafile; and after receiving the notification, stopping reproducing the video data stream of the second content and continue reproducing the audio data stream of the second content.

* * * * *